(12) United States Patent
Walsh

(10) Patent No.: US 12,401,597 B1
(45) Date of Patent: Aug. 26, 2025

(54) SYSTEMS AND METHODS FOR COMMUNICATION BETWEEN REMOTE ENVIRONMENTS

(71) Applicant: Parry Labs, LLC, Alexandria, VA (US)

(72) Inventor: David Walsh, Alexandria, VA (US)

(73) Assignee: Parry Labs, LLC, Alexandria, VA (US)

( * ) Notice: Subject to any disclaimer, the term of this patent is extended or adjusted under 35 U.S.C. 154(b) by 0 days.

(21) Appl. No.: 18/910,426

(22) Filed: Oct. 9, 2024

(51) Int. Cl.
*H04L 47/24* (2022.01)
*H04L 45/02* (2022.01)
*H04L 47/11* (2022.01)

(52) U.S. Cl.
CPC .............. *H04L 47/24* (2013.01); *H04L 45/02* (2013.01); *H04L 47/11* (2013.01)

(58) Field of Classification Search
CPC ........... H04L 47/24; H04L 45/02; H04L 47/11
See application file for complete search history.

(56) References Cited

U.S. PATENT DOCUMENTS

| | | | | |
|---|---|---|---|---|
| 2020/0162371 | A1* | 5/2020 | Musku | H04L 45/04 |
| 2022/0124548 | A1* | 4/2022 | Srivastava | H04W 28/0268 |
| 2022/0191142 | A1* | 6/2022 | Mermoud | H04L 45/64 |
| 2022/0196426 | A1* | 6/2022 | Xu | G01C 21/3461 |
| 2024/0305577 | A1* | 9/2024 | Snyder | H04L 47/28 |
| 2024/0323112 | A1* | 9/2024 | Mermoud | H04L 45/302 |

* cited by examiner

*Primary Examiner* — Donald L Mills
(74) *Attorney, Agent, or Firm* — Caldwell Intellectual Property Law

(57) ABSTRACT

A system for communication between remote environments includes at least a processor and a memory communicatively connected to the at least a processor, the memory containing instructions configuring the at least a processor to receive transmission data from one or more operating environments wherein the transmission data includes an intended recipient of the transmission data and a transmission priority, identify one or more network devices on one or more communication networks, wherein identifying one or more network devices further includes determining a congestion datum for each of the one or more network devices, dynamically determine a routing path for the transmission data as a function of the at least a transmission priority and the one or more network devices and transmit the transmission data to the intended recipient through the routing path.

18 Claims, 9 Drawing Sheets

SYSTEMS AND METHODS FOR COMMUNICATION BETWEEN REMOTE ENVIRONMENTS

FIELD OF THE INVENTION

The present invention generally relates to the field of communication. In particular, the present invention is directed to systems and methods for communication between remote environments.

BACKGROUND

Traditional network architectures often struggle to handle the dynamic demands and traffic patterns of modern applications. In addition, traditional network architectures lack the flexibility to quickly adapt to changing conditions, making them prone to outages, inefficiencies, and security vulnerabilities.

SUMMARY OF THE DISCLOSURE

In an aspect, a system for communication between remote environments is described. The system includes at least a processor, and a memory communicatively connected to the at least a processor. The memory contains instructions configuring the at least a processor to receive transmission data from one or more operating environments wherein the transmission data includes an intended recipient of the transmission data a transmission priority, identify one or more network devices on one or more communication networks, wherein identifying one or more network devices further includes determining a congestion datum for each of the one or more network devices, dynamically determine a routing path for the transmission data as a function of the at least a transmission priority and the one or more network devices and transmit the transmission data to the intended recipient through the routing path.

In another aspect, a method for communication between remote environments is described. The method includes receiving, by at least a processor, transmission data from one or more operating environments wherein the transmission data includes an intended recipient of the transmission data and a transmission priority, identifying, by the at least a processor, one or more network devices on one or more communication networks, wherein identifying one or more network devices further includes determining a congestion datum for each of the one or more network devices, dynamically determining, by the at least a processor, a routing path for the transmission data as a function of the at least a transmission priority and the one or more network devices and transmitting, by the at least a processor, the transmission data to the intended recipient through the routing path.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

At a high level, aspects of the present disclosure are directed to systems and methods for communication between remote environments. In an aspect, embodiments of the present disclosure include a processor configured to receive transmission data from an operating environment, identify network devices on communication networks, determine a routing path and transmit the transmission data.

Aspects of the present disclosure can be used to identify network devices and communication networks suitable for transmission and dynamically generate routing paths to ensure efficiency. Exemplary embodiments illustrating aspects of the present disclosure are described below in the context of several specific examples.

Figure 1:
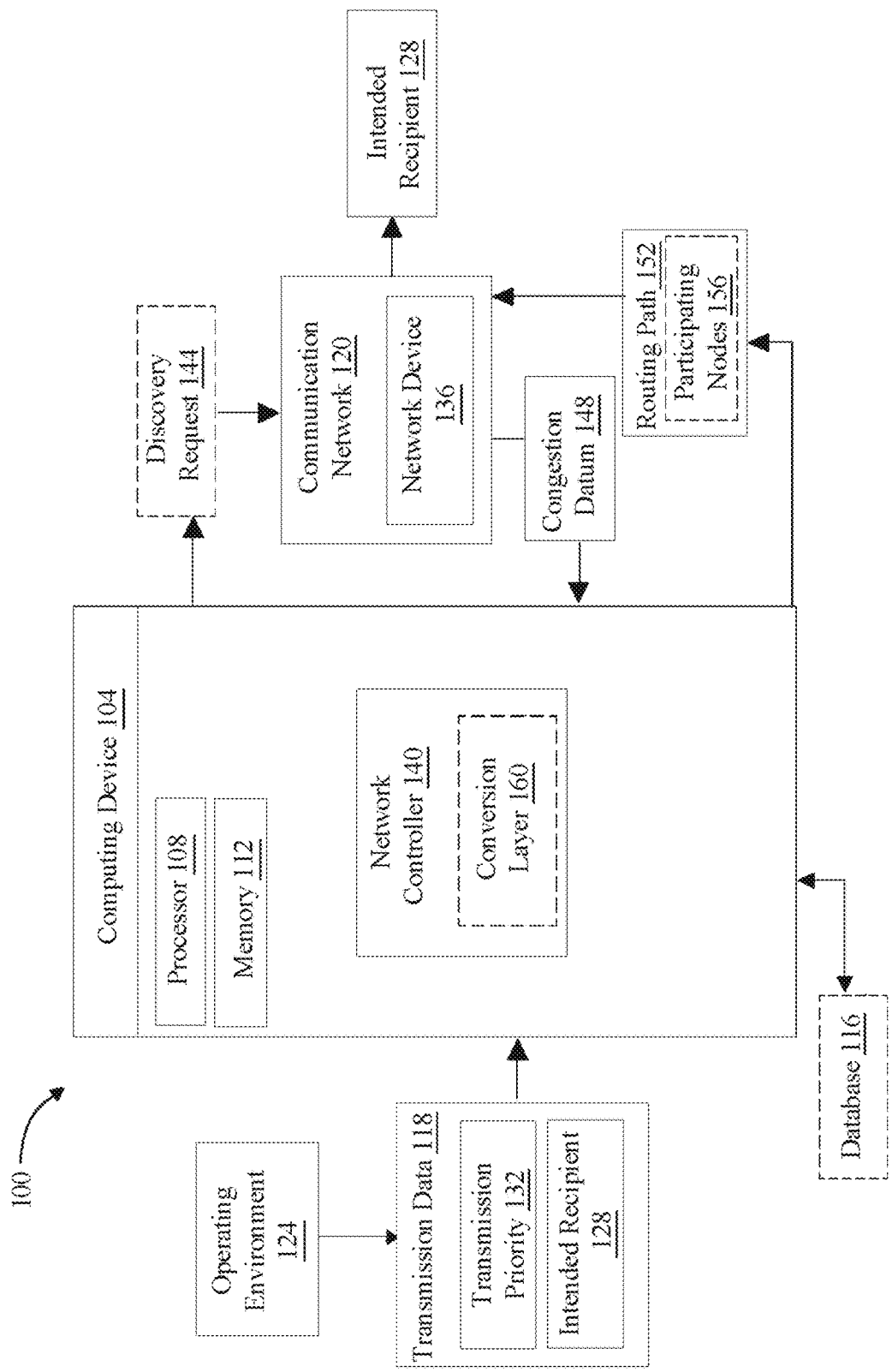
FIG. 1 is a block diagram of an exemplary embodiment of a system for communication between remote environments.

Referring now to FIG. 1, a system 100 for communication between remote environments is described. System 100 includes a computing device 104. System 100 includes a processor 108. Processor 108 may include, without limitation, any processor 108 described in this disclosure. Processor 108 may be included in a and/or consistent with computing device 104. In one or more embodiments, processor 108 may include a multi-core processor. In one or more embodiments, multi-core processor may include multiple processor cores and/or individual processing units. "Processing unit" for the purposes of this disclosure is a device that is capable of executing instructions and performing calculations for a computing device. In one or more embodiments, processing unit may be included within a processor, a core of a processor, an FPGA IP core such as picoblaze, and the like. In one or more embodiments, processing units may retrieve instructions from a memory, decode the data, secure functions and transmit the functions back to the memory. In one or more embodiments, processing units may include an arithmetic logic unit (ALU) wherein the ALU is responsible for carrying out arithmetic and logical operations. This may include, addition, subtraction, multiplication, comparing two data, contrasting two data and the like. In one or more embodiment, processing unit may include a control unit wherein the control unit manages execution of instructions such that they are performed in the correct order. In none or more embodiments, processing unit may include registers wherein the registers may be used for temporary storage of data such as inputs fed into the processor and/or outputs executed by the processor. In one or more embodiments, processing unit may include cache memory wherein memory may be retrieved from cache memory for retrieval of data. In one or more embodiments, processing unit may include a clock register wherein the clock register is configured to synchronize the processor with other computing components. In one or more embodiments, processor 108 may include more than one processing units having at least one or more arithmetic and logic units (ALUs) with hardware components that may perform arithmetic and logic operations. Processing units may further include registers to hold operands and results, as well as potentially "reservation station" queues of registers, registers to store interim results in multi-cycle operations, and an instruction unit/control circuit (including e.g. a finite state machine and/or multiplexor) that reads op codes from program instruction register banks and/or receives those op codes and enables registers/arithmetic and logic operators to read/output values. In one or more embodiments, processing unit may include a floating-point unit (FPU) wherein the FPU is configured to handle arithmetic operations with floating point numbers. In one or more embodiments, processor 108 may include a plurality of processing units wherein each processing unit may be configured for a particular task and/or function. In one or more embodiments, each core within multi-core processor may function independently. In one or more embodiments, each core within multi-core processor may perform functions in parallel with other cores. In one or more embodiments, multi-core processor may allow for a dedicated core for each program and/or software running on a computing system. In one or more embodiments, multiple cores may be used for a singular function and/or multiple functions. In one or more embodiments, multi-core processor may allow for a computing system to perform differing functions in parallel. In one or more embodiments, processor 108 may include a plurality of multi-core processors. Computing device 104 may include any computing device as described in this disclosure, including without limitation a microcontroller, microprocessor, digital signal processor (DSP) and/or system on a chip (SoC) as described in this disclosure. Computing device 104 may include, be included in, and/or communicate with a mobile device such as a mobile telephone or smartphone. Computing device 104 may include a single computing device 104 operating independently or may include two or more computing devices operating in concert, in parallel, sequentially or the like; two or more computing devices may be included together in a single computing device 104 or in two or more computing devices. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device 104. Computing device 104 may include but is not limited to, for example, a computing device 104 or cluster of computing devices in a first location and a second computing device 104 or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device 104, which may operate in parallel, in series, redundantly, or in any other manner used for distribution of tasks or memory 112 between computing devices. Computing device 104 may be implemented, as a non-limiting example, using a "shared nothing" architecture.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, computing device 104 may perform determinations, classification, and/or analysis steps, methods, processes, or the like as described in this disclosure using machine-learning processes. A "machine-learning process," as used in this disclosure, is a process that automatedly uses a body of data known as "training data" and/or a "training set" (described further below in this disclosure) to generate an algorithm that will be performed by a Processor module to produce outputs given data provided as inputs; this is in contrast to a non-machine learning software program where the commands to be executed are determined in advance by a user and written in a programming language. A machine-learning process may utilize supervised, unsupervised, lazy-learning processes and/or neural networks, described further below.

With continued reference to FIG. 1, system 100 includes a memory 112 communicatively connected to processor 108, wherein the memory 112 contains instructions configuring processor 108 to perform any processing steps as described herein. As used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, and without limitation, using a bus or other facility for intercommunication between elements of a computing device 104. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, memory 112 may include a primary memory and a secondary memory. "Primary memory" also known as "random access memory" (RAM) for the purposes of this disclosure is a short-term storage device in which information is processed. In one or more embodiments, during use of computing device 104, instructions and/or information may be transmitted to primary memory wherein information may be processed. In one or more embodiments, information may only be populated within primary memory while a particular software is running. In one or more embodiments, information within primary memory is wiped and/or removed after computing device 104 has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power. "Secondary memory" also known as "storage," "hard disk drive" and the like for the purposes of this disclosure is a long-term storage device in which an operating system and other information is stored. In one or remote embodiments, information may be retrieved from secondary memory and transmitted to primary memory during use. In one or more embodiments, secondary memory may be referred to as non-volatile memory wherein information is preserved even during a loss of power. In one or more embodiments, data within secondary memory cannot be accessed by processor. In one or more embodiments, data is transferred from secondary to primary memory wherein processor 108 may access the information from primary memory.

Still referring to FIG. 1, System 100 may include a database 116. Database may include a remote database 116. Database 116 may be implemented, without limitation, as a relational database, a key-value retrieval database such as a NOSQL database, or any other format or structure for use as database that a person skilled in the art would recognize as suitable upon review of the entirety of this disclosure. Database may alternatively or additionally be implemented using a distributed data storage protocol and/or data structure, such as a distributed hash table or the like. Database 116 may include a plurality of data entries and/or records as described above. Data entries in database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in database may store, retrieve, organize, and/or reflect data and/or records.

With continued reference to FIG. 1, system 100 may include and/or be communicatively connected to a server, such as but not limited to, a remote server, a cloud server, a network server and the like. In one or more embodiments, computing device 104 may be configured to transmit one or more processes to be executed by server. In one or more embodiments, server may contain additional and/or increased processor power wherein one or more processes as described below may be performed by server. For example, and without limitation, one or more processes associated with machine learning may be performed by network server, wherein data is transmitted to server, processed and transmitted back to computing device. In one or more embodiments, server may be configured to perform one or more processes as described below to allow for increased computational power and/or decreased power usage by system computing device 104. In one or more embodiments, computing device 104 may transmit processes to server wherein computing device 104 may conserve power or energy.

With continued reference to FIG. 1, system 100 may include a host circuit. Host circuit includes at least a processor 108 communicatively connected to a memory 112. As used in this disclosure, a "host circuit" is an integrated circuit or a collection of interconnected circuits designed to manage, control, and/or interface with one or more functionalities in a system. In a non-limiting example, host circuit may be configured as a primary platform or base that provides essential infrastructure, resources, and interfaces to facilitate the operation of other connected or integrated components. Hosting circuit may include any computing device as described in this disclosure, including without limitation a microcontroller, microprocessor, digital signal processor (DSP) and/or system on a chip (SoC) that provide one or more services, resources, or data to other computing devices. Host circuit may include, be included in, and/or communicate with a mobile device such as a mobile telephone or smartphone. Host circuit may include a single computing device operating independently, or may include two or more computing device operating in concert, in parallel, sequentially or the like; two or more computing devices may be included together in a single computing device or in two or more computing devices. In some cases, Host circuit may include but is not limited to, for example, a computing device or cluster of computing devices in a first location and a second computing device or cluster of computing devices in a second location. In other cases, host circuit may include a main unit or a primary circuit in a network that controls communications and/or provide a central point of interface. In one or more embodiments, host circuit may be used in lieu of computing device 104. In one or more embodiments, host circuit may carry out one or more processes as described in this disclosure intended for computing device 104.

With continued reference to FIG. 1, in or more embodiments, system 100 may implement one or more aspects of Future Airborne Computing Environment (FACE). As used in this disclosure, a "Future Airborne Computing Environment" is a technical standard and business strategy for promoting acquisition of open systems software architecture in aviation industry, specifically for military avionics system. In some cases, system 100 may employ FACE approach, wherein a computing device may run in a common operating environment to support one or more portable capability software applications across a plurality of department of defense (DoD) avionics systems. In some cases, FACE may include a plurality of software application programming interfaces (APIs) grouped into "segments." In a non-limiting example, FACE may include operating system segments (OSS), platform specific services segment (PSSS), I/O service segment, transport services segment, and/or the like. In some cases, FACE may provide a bounding box around software items and APIs, i.e., FACE Boundary. In some cases, system 100 may include one or more extensions to FACE that satisfy safety assumptions in hardware outside FACE Boundary. In a non-limiting example, FACE may include a plurality of API groups (i.e., segments), wherein one or more API groups may be dependencies for avionics functional software (i.e., portable component segment [PCS]) to be deployed to FACE. In some cases, such avionics functional software may not need any dependencies. Additionally, or alternatively, FACE may also anticipate one or more hardware resources which software (i.e., portable component segment deployed within the FACE Boundary) may or may not require to satisfy their hardware assumptions and/or dependencies. In a non-limiting example, FACE may include a health monitoring monitor, interface hardware such as Ethernet device driver (within operating system segment) configured to infer specific hardware assumptions.

With continued reference to FIG. 1, processor 108 is configured to identify and/or receive transmission data 118 for transmission on a communication network. "Transmission data" for the purposes of this disclosure is information that is to be transmitted from one device to another. For example, and without limitation, transmission data 118 may include a transmission containing a text, a video message, an update to an existing software and/or the like. In one or more embodiments, transmission data 118 may include information such as but not limited to, additional software capabilities, additional system requirements, changes to one or more processes within a system, changes to the visual design of a system, changes to the user interface of a system and the like. In one or more embodiments, transmission data 118 may be used to correct instructions and/or code on a software, to modify the capability of a software and the like. In one or more embodiments, transmission data 118 may include information associated with a software that is to be modified. This may include but is not limited to the name of the software, compatibility information, system requirements, the date in which transmission data 118 was generated for the software, the version number of transmission data 118, information indicating potential changes to the software, information indicating additions to the software and the like. In one or more embodiments transmission data 118 may include modifications to a weapons system such as but not limited to, guided missile systems, smart bombs, automated defense systems, unmanned aerial vehicles, threat identification systems, Artificial intelligent algorithms, weapons, operational flight programs, avionics systems and the like. In one or more embodiments, transmission data 118 may include modifications to an operating system, modifications to an operating system used for aviation, modifications to an aviation system, modifications to aircraft systems and the like. In one or more embodiments, transmission data may include communications made between two or more computing devices, such as but not limited, textual communications, audio communications, video communications and/or the like. In one or more embodiments, transmission data may include information received from recording devices such as but not limited to, sensors, video cameras and/or any other device capable of recording information.

With continued reference to FIG. 1, transmission data 118 may include, and/or be associated with, a design assurance level (DAL) classification. A "design assurance level classification," for the purposes of this disclosure in a labeling of software based on the effects caused by a failure of the software. For example, and without limitation, a software failure associated with a first software which can potentially put human lives at risk may receive a particular classification whereas a software failure associated with a second software which may, at most, slightly injure an individual may be given a differing classification. In one or more embodiments, each software may be associated with a particular DAL classification. DAL classification may range from A-E wherein a DAL-A classification may indicate the software may cause death during failure, whereas as a DAL-E classification may indicate that there is no potential harm in the event of a software failure. In one or more embodiments, various software may be given classifications based on their inherent risk to cause harm to individuals. In one or more embodiments, the DAL of a software may indicate that one software may require more testing, safety protocols and the like in comparison to other software. For example, a DAL-E classified software may not require much testing as failure may not harm individuals, whereas a DAL-A may require stringent testing to ensure that failure does not occur. In one or more embodiments, each DAL classification may contain minimum resource requirements such as minimum processing power, minimum space allocation, and the like. In one or more embodiments, transmission data 118 may contain a DAL classification, wherein the DAL classification indicates the type of system or software in which transmission data 118 was received from. In one or more embodiments, DAL classification may be determined based on the source of transmission data 118. For example, and without limitation, transmission data 118 may contain the same DAL classification as the device from which it was transmitted from.

With continued reference to FIG. 1, transmission data may be configured for transmission along a communication network 120. A "communication network" for the purposes of this disclosure is a system that enables the exchange of data between devices or systems. Communication networks 120 may be wired, wireless and/or a combination of both. In one or more embodiments, communication networks 120 may include, but are not limited to, Local area networks., Wide area networks, data center networks, cloud networks, wireless networks, Wi-Fi, 3G, 4G, 5G, Bluetooth, radio access networks, fiber optic networks, satellite networks, microwave networks, ethernet networks, optical transport networks, virtual networks, Tactual data links, satellite communication networks 120 (SATCOM), mobile ad-hoc networks, mesh networks, high-frequency radio networks, edge computing networks, space-based networks and/or any other network in which data may be exchanged. In one or more embodiments, processor may receive transmission data to be transmitted. In one or more embodiments, systems and/or software may transmit transmission data to system 100, wherein system 100 may transmit transmission data.

With continued reference to FIG. 1, transmission data may be received and/or originate from an operating environment 124. An "operating environment" for the purposes of this disclosure refers to the combination of hardware and software that allows a computer software to function or execute. For example, and without limitation, operating environment 124 may include an operating system, device drivers, virtual machines, software containers, software modules, executable programs and the like. In one or more embodiments, operating environment 124 may allow for the execution of computer software. In one or more embodiments, operating environments 124 may allow for the execution of software modules and/or software containers. software container may include a container image. A "software image," also known as a "container image," as described herein, is a snapshot or a packaged representation of an entire software state, including executable code, configurations, dependencies/libraries, and other required data. In some cases, software image may include source code, libraries, and other software components that the software relies on. In some cases, software image may include one or more configuration files which define a plurality of settings, parameters, and other configurations for the software. In some cases, configuration files may include certain OS configurations, environmental variables, or other system-level settings. In a non-limiting example software image may include a portable executable image combined with a manifest file that is used by a container manager as described below to deploy the software image on an operating environment 124 with appropriate data services and restrictions. In some cases, software image may be used to package a software application with its entire collection of dependencies, ensuring that the software application can run consistently across different SOEs. Exemplary software applications may include, without limitation, flight management system (FMS) software, air traffic control (ATC) software, avionics systems, electronic flight bag (EFB) software, ground support equipment software, weather forecasting and reporting software, cockpit display rendering software, and/or the like. In some cases, software image may include a virtual machine image that encapsulate a whole operating system along with one or more pre-installed software applications. Such software may be easily replicated across a plurality of host circuits e.g., servers or cloud environment. In other cases, software image may be used as a backup snapshot to restore/roll back system or a software application to a known working state. A "software module" for the purposes of this disclosure, is an application or software that is sought to be executed. For example, and without limitation, software module may include a web browser, word processing software, a media player, a digital calculator, flight systems software, military software and the like. In one or more embodiments, software module may include an application that is sought to be executed within software container. In one or more embodiments, any data and/or information within software container may be used to ensure proper execution of software module. In one or more embodiments, software container may contain libraries, dependencies, and the like to ensure proper execution of software module. In one or more embodiments, software module may include an executable file. In one or more embodiments, software module may include third party application wherein $3^{rd}$ party applications may include software and/or application created and/or managed by a differing entity. In one or more embodiments, software module may include previously developed applications wherein the previously developed application are modified to interact with a particular environment. In one or more embodiments, software container may allow for a third-party application and/or previously developed application to be deployed within multiple virtual environments and/or operating system. In one or more embodiments, software module may include a previously developed application and/or $3^{rd}$ party application wherein software module may be placed within software container to allow for software module to operate within multiple environments. A "software container" for the purposes of this disclosure is an executable package that is capable of running software within an isolated space. For example, and without limitation, software container may include a document drafting software wherein the software container may contain any information, runtime environment and the like necessary to execute the document drafting software on more than one operating systems. In one or more embodiments, software containers may create a virtualized environment wherein a software may run within the virtualized environment. In one or more embodiments, operating environment 124 may include a virtualized environment. A "virtualized environment," for the purposes of this disclosure is a system in which software may be isolated while still operating on a host operating system. For example, and without limitation, software container may operate in a virtualized environment wherein a software within software container may not communicate with the host operating system. In one or more embodiments, software container may allow for OS virtualization wherein a software may be isolated from a host operating system while still sharing the host operating system kernel. An "Operating system (OS) level virtualization," for the purposes of this discourse is a system in which an operating system kernel allows the existence of multiple isolated environment. In OS virtualization, a software within software container may not have access to resources of the host operating system. Instead, the software may only have access to the contents within software container. In one or more embodiments, operating environment 124 may include a host operating system. A "host operating system" for the purposes of this disclosure is a primary operating system running on processor 108. In one or more embodiments, software container may be executed atop host operating system. In one or more embodiments, virtual operating systems may exist atop host operating system. In one or more embodiments, host operating system may include an operating system configured to allow instantiation of one or more software containers, one or more virtual machines and the like. In one or more embodiments, software container may communicate with host operating system to receive resources from processor 108 and/or memory. In one or more embodiments, an ordinary software operating outside of a software container may have access to various operating system resources such as but not limited to, processing capabilities, file systems, networks and the like. In contrast, a software operating within a software container may only have access to the contents within the software container. This may include various files, network capabilities and the like. In one or more embodiments, a software within software container may communicate with software container wherein software container may transmit the commands to the processor 108. In one or more embodiments, software container may contain application-level virtualization. "Application-level virtualization" for the purposes of this disclosure is a system in which a software may be completely encapsulated from a host operating system such that the software may not share the host operating system kernel. In one or more embodiments, in application-level virtualization an application may be encapsulated within a virtual environment as described in further detail below. In one or more embodiments, in application-level virtualization an application may communicate through a virtualization layer such as one created by a hypervisor. In one or more embodiments, application virtualization may include a process in which the application does not rely on the host operating system kernel. In one or more embodiments, software container may contain OS level virtualization wherein a software within software container may be executed in a virtualized environment. In one or more embodiments, software container may contain application virtualization wherein a software may be executed on multiple differing operating system. In one or more embodiments, in an OS level virtualization, a software may be dependent on the host operating system kernel wherein in an application virtualization, the software may run independent of the host operating system kernel. In one or more embodiments, software container may isolate an application from a surrounding environment wherein the software may operate in a runtime environment. In one or more embodiments, the runtime environment includes everything necessary to allow for isolation of a software from the host operating system. This may include but is not limited to, application and/or software code, dependencies, runtime components needed to execute the application such as access to a database 116, and the like. In one or more embodiments, a software within software container may operate in a runtime environment wherein the software may be isolated from the host operating system. In one or more embodiments, software container may allow for an application to be executed and/or deployed on multiple operating systems. In one or more embodiments, software container may contain libraries, configuration files, binary code and/or any other information that is necessary to execute the application and/or software. In one or more embodiments, a software container may contain some degree of independence from the operating system and/or host system wherein the software container does not rely on the operating system for any information needed to properly deploy an application within software container. In one or more embodiments, operating systems may lack the proper functionalities to execute an application, wherein software container may be used to ensure that any necessary functionalities, information, and the like are self-contained. In one or more embodiments, software container may contain a container image, wherein the container image is a portable executable image combined with a manifest that is used by a container manager to deploy the container image on an operating environment 124 with appropriate data services and restrictions. In one or more embodiments, software container may contain restrictions and/or instructions on how a software may communicate with the operating system in which it is deployed on. In one or more embodiments, software container may contain a container manager, wherein the container manager has the ability to deploy container images on the operating system. The container manager may interface with container image repositories, validate the authenticity of container images, load container executables into container environments, connect container environments to operating service, and exports management application user interfaces (API) to system management tools. In one or more embodiments, software container may include any software container as described in U.S. Nonprovisional application Ser. No. 18/395,210 filed on Dec. 12, 2023 and entitled "SYSTEM AND METHOD FOR A SAFETY CRITICAL OPERATING ENVIRONMENT CONTAINER ARCHITECTURE", and U.S. Nonprovisional application Ser. No. 18/443,570 filed on Feb. 16, 2024 and entitled "SYSTEM AND METHODS FOR PROVIDING INTEROPERABLE NETWORKS AND COMMUNICATIONS", the entirety of which are incorporated herein by reference.

With continued reference to FIG. 1, operating environment 124 may include a network agent. A "network agent" for the purposes of this disclosure is a software deployed within a container or virtual machine in order to interact with the underlying network infrastructure. In one or more embodiments, network agent may monitor traffic that enters or leaves operating environment 124. In one or more embodiments, network agent may interact with an underlying network infrastructure wherein network agent may receive information that is being transmitted to and/or receive from a communication network 120. In one or more embodiments, network agent may monitor traffic that enters or leaves operating environment 124, such as for example, transmission data 118. In one or more embodiments, network agent may track flow statistics like packet counts, bandwidth usage, connection latencies and/or the like.

With continued reference to FIG. 1, each operating environment 124 may include a virtual network interface. A "Virtual network interface" for the purposes of this disclosure is a virtual representation of a physical network which allows virtual machines, containers or other isolated environment to connect to an external network. In one or more embodiments, virtual networks may serve as a bridge between physical networks and isolated environments. In one or more embodiments virtual network interfaces allow for isolated environments, such as operating environment 124 to communicate with physical networks. In one or more embodiments, a virtual network interface may emulate the behavior of a physical network interface card. In one or more embodiments, each isolated environment and/or operating environment 124 may contain its own virtual network interface. In one or more embodiments, operating environment 124 may include a virtual network interface wherein the virtual network interface allows operating environment 124 to communicate with other operating environments 124 and/or physical networks. In one or more embodiment, virtual network interface may include a virtualized network device 136 that is used to forward packets based on flow rules or routing traffic between different network segments. In one or more embodiments, virtual network device 136 may operate on a server, wherein the server acts a forwarding engine, analyzing header information and forwarding or routing them based on policies and flow rules. In one or more embodiments, virtual network device 136 may be used to identify information that is being transmitted through a network and/or from operating environments 124.

With continued reference to FIG. 1, network agents within operating environment 124 may monitor virtual network interface associated with operating environment 124. In one or more embodiments, network agent may be configured to monitor all incoming and/or outgoing communication pass through virtual network interface. In one or more embodiments, network agent may be configured to identify transmission data 118 and/or a request to transmit transmission data 118.

With continued reference to FIG. 1, system 100 may receive transmission data 118 and/or receive a request associated with the transmission of transmission data 118. In one or more embodiments, processor 108 and/or system 100 may receive a request wherein the request indicates that data is ready for transmission. In one or more embodiments, processor 108 may receive transmission data 118 and/or information associated with transmission data 118. In one or more embodiments, processor 108 may receive metadata associated with transmission data 118. "Metadata" for the purposes of this disclosure refers to descriptive information about a particular set of data. For example, and without limitation, metadata may include a file size, a creation date, a source of transmission data 118 and/or the like. In one or more embodiments, metadata may include header information wherein the head information may include information indicating how to process, route or interpret transmission data 118. In one or more embodiments, each transmission within a network may include the actual file and the header information. In this instance, the actual file may refer to transmission data 118. In one or more embodiments, the header information may include the source of the file, the destination of the file, the particular network protocol being used and/or the like. In one or more embodiments, header information may be used to guide data and/or packet through a network and ensure that it reaches its destination. In one or more embodiments, header information may include but is not limited to, the source and destination of transmission data 118, frame types, the source IP address, the destination IP address, the time to live, and/or the transport protocol. The source port, the destination port, the sequence numbers and/or the like. In one or more embodiments, network agent may analyze header information in order to determine the source, destination, ports and/or protocols of transmission data 118.

With continued reference to FIG. 1, metadata may include an intended recipient 128 of transmission data 118. In one or more embodiments, an intended recipient 128 of transmission data 118 may include a differing operating environment 124, a remote device, an external device, a virtual environment separate from operating environment 124, a server, a network, a group of remote devices and/or the like. In one or more embodiments, metadata may further include a transmission priority 132. A "transmission priority" for the purposes of this disclosure is a determination of an importance of a datum being transmitted through a network. For example, and without limitation, a first datum containing important information may be given a higher transmission priority 132 over a second datum wherein the first datum may be prioritized during transmission. In one or more embodiments, transmission priority 132 may include a DAL classification wherein transmission data 118 having higher DAL classification may receive priority on a congested communication network 120. In one or more embodiments, transmission priority 132 may include a Differentiated service code point (DSCP), wherein the DSCP may be used for priority handling. In one or more embodiments, processor 108 and/or devices such as router and switches may read the DSCP value of transmission data 118 and determine how to transmit transmission data 118. In one or more embodiments, a particular DSCP value may indicate priority forwarding or allocating more bandwidth. In one or more embodiments, transmission priority 132 may include information indicating high priority, low priority and/or contain various protocols that indicate a priority of transmission data 118. In one or more embodiments, transmission priority 132 may include information within metadata that may indicate the importance of a document or communication in comparison to other documents or transmissions.

With continued reference to FIG. 1, in one or more embodiments, processor 108 may be configured to receive transmission data from software and/or software modules operating within operating environment 124. In one or more embodiments, one or more software and/or software modules may transmit transmission data 118 to processor 108 and/or network controller (as described in further detail below). In one or more embodiments, operating environment may be connected to a virtual network wherein data from software and software modules may be transmitted to the virtual network. In one or more embodiments, processor 108 may receive transmission data through the virtual network. In one or more embodiments, transmission priority 132 may be generated by the software and/or software module in which transmission data originated from. For example, and without limitation, software or software module may include a particular DAL classification wherein transmission data 118 may include the same or similar DAL classification. In one or more embodiments, software or software module may assign or generate transmission priority 132 for transmission data 118. In one or more embodiments, operating environment 124 may assign or generate tranmissio0mn priority. In one or more embodiments, processor 108 and/or network controller 140 may include a node in a network of nodes wherein processor 108 may receive transmission data 118 from a previous node. In one or more embodiments, processor 108 may be configured to transmit transmission data 118 to a subsequent node in a network. This will be described in further detail below.

With continued reference to FIG. 1, processor 108 may receive transmission data 118 and/or receive information associated with transmission of transmission data 118 such as metadata. In one or more embodiments, processor 108 may be configured to control traffic on a communication network 120, wherein processor 108 may monitor communication network 120 for transmission. In one or more embodiments, processor 108 and/or network agent may receive a data packet such as transmission data 118 and check its flow table in order to determine how to handle the packet. A "Flow table" for the purposes of this disclosure is a list of rules that determine how a packet is transmitted. In one or more embodiments, processor 108 and/or network agent may create a flow table indicating rules for each set of data that is transmitted. In one or more embodiments, flow table may specify how to handle incoming packets. In one or embodiments, processor 108 and/or network agent may identify packets on a network, identify whether a rule exists within the flow table and generate a rule for the packet in the flow table.

With continued reference to FIG. 1, network agent may be responsible for identifying transmission data 118 that is received from operating environment 124. In one or more embodiments, network agent may inform processor 108 of transmission data 118. In one or more embodiments, network agent may communicate with processor 108 to inform processor 108 of incoming and/or outgoing communications. In one or more embodiments, network switch may communicate with processor 108 that transmission data 118 is received. In one or more embodiments, network switch may compare transmission data 118 to flow table, wherein network switch may determine if a particular transmission data 118 already contains rules generated by processor 108. In one or more embodiments, network agent may facilitate communication between processor 108 and operating environment 124. In one or more embodiments, operating environment 124 and/or processor 108 may exist on a remote computing device 104, such as a cloud network server and/or the like.

With continued reference to FIG. 1, processor 108 may receive transmission data 118 by receiving information from network agent of an incoming or outgoing communication.

In one or more embodiments, operating environment 124 may transmit transmission data 118 directly to processor 108 and/or inform processor 108 of transmission data 118 that is ready for transmission. In one or more embodiments, operating environment 124 may interact with virtual network interface wherein virtual network interface may inform processor 108 of transmission data 118 that is to be transmitted. In one or more embodiments, processor 108 may receive transmission data 118 directly from operating environment 124 such as through a hypervisor or orchestrator. In one or more embodiments, each operating environment 124 may include a virtual switch wherein the virtual switch is responsible for routing traffic to and/or from operating environment 124. In one or more embodiments, processor 108 may communicate with virtual network interface to identify transmission of transmission data 118. In one or more embodiments, network agent may route transmission data 118 to processor 108 for routing decisions.

With continued reference to FIG. 1, in one or more embodiments, system 100 may include a network controller 140 operating on processor 108. A "network controller" for the purposes of this disclosure refers to a system responsible for controlling the behavior of one or more communication networks 120. In one or more embodiments, network controller 140 may receive data that is ready for transmission and make routing decisions based on the state of current networks that are available. In one or more embodiments, network controller 140 may dictate policies for a particular communication network. In one or more embodiments, network controller 140 may monitor network traffic, utilization, bandwidth security issues and/or the like.

With continued reference to FIG. 1, network controller 140 and/or processor 108 may be configured to identify network devices 136 on one or more communication networks 120. In one or more embodiments, network controller 140 may identify a particular communication network 120 in which transmission data 118 may be routed through. A "network device" for the purposes of this disclosure is a computing device and/or physical or virtual component thereof that is communicatively connected to system 100 by a network connection. In one or more embodiments, network device 136 may enable communication between computing device 104 and a communication network 120. In one or more embodiments, network devices 136 may include but are not limited to routers, switches, hubs, Access points, modems, gateways, bridges, network interface cards, proxy servers, DNS servers, satellite modems, satellite dish, radio transceivers, microwave antennas, cellular modems, cellular towers, radio gateways, equipment for radio access networks and/or any other devices that may allow computing device 104 to communicate through a communication network 120. In one or more embodiments, network controller 140 may identify network devices 136 in order to determine a particular communication network 120 and/or path for transmission data 118. In one or more embodiments, network controller 140 may utilize a link layer discovery protocol (LLDP) in order to identify network devices 136 on or more communication networks 120. "Link layer discovery protocol" as described in this disclosure refers to a network discovery protocol that is used to detect neighboring network devices 136 in a network. In one or more embodiments, network controller 140 may dynamically discover devices by identifying LLDP messages that have been transmitted from said devices. In one or more embodiments, network controller 140 may identify network devices 136 on communication network 120 through discovery protocols such as but not limited to, openflow, simple network management protocol, network agents operating on network devices 136, through Application program interfaces and/or the like. In one or more embodiments, network controller 140 may be configured to identify virtual networks operating on processor 108. In one or more embodiments, network controller 140 may identify network switches, virtual switches, virtual network interfaces, overlay networks and/or the like, wherein network controller 140 may communicate with the virtual devices. In one or more embodiments, network devices 136 may automatically transmit communications, wherein network controller 140 may receive communications and identify network devices 136.

With continued reference to FIG. 1, network controller 140 may further include one or more software defined intelligent networking (SDIN) systems. "Software defined network" (SDN) for the purposes of this disclosure is a system in which virtual networks can be created to direct traffic on a network. In contrast to hardware devices such as routers which may control a network through hardware, SDN may be used to control a network through software. In one or more embodiments, SDN may be used to control a network wherein data packets may be routed using SDN. In one or more embodiments, SDN may act as an intermediary between an application or software and a network wherein the SDN may control the software interacts with the network. SDN may be used to monitor and control network conditions. In one or more embodiments, SDN may be used to manage network resources for various software containers or operating environments. Software containers may be limited in network resources due to their level of importance; such that less important software containers do not crowd a network for less important matters. "Software defined intelligent network" (SDIN) for the purposes of this disclosure. is an SDN which utilizes artificial intelligence and machine learning to optimize the performance of a network. In SDIN, machine learning may be used to predict issues, predict network demands and adjust the network accordingly. In some cases, SDIN may be used to ensure that software containers or operating environments do not interact with one another. An SDIN controller may be used to interact with a network. The SDIN controller may monitor network traffic and make decision to optimize traffic for software container. In one or more embodiments, SDIN may ensure enable dynamic mesh networks, and facilitate assured, secure data sharing across Link-16, BFT, 4586, and RAC2.

With continued reference to FIG. 1, network controller 140 may be located and/or situated within operating environment 124. In one or more embodiments, network controller 140 may be configured to transmit transmission data 118 from within operating environment 124 to an external environment. An "external environment" for the purposes of this disclosure refers to an environment located outside of operating environment. For example, and without limitation, external environment may include a host operating system outside of a virtual machine or virtual environment, a separate operating environment, a remote device, a network server, a cloud network and/or the like. In one or more embodiments, network controller may be configured to facilitate transmission of transmission data 118 through the use of virtual networks, wherein network controller may act as a bridge between operating environment and communication network located outside of operating environment 124. In one or more embodiments, one or more processes by processor 108 and/or network controller may be done from within operating environment 124.

With continued reference to FIG. 1, network devices 136 may include and/or be associated with one or more disparate networks. A "disparate network" for the purposes of this disclosure refers to a network that differs in architecture, protocols, technologies or management structures in comparison to another network. For example, and without limitation, disparate networks may include a Wi-Fi network in comparison to Bluetooth. In one or more embodiments, disparate networks may include networks with differing protocols, networks with different routing mechanisms and/or the like. In one or more embodiments, network devices 136 may include disparate networks wherein network devices 136 may operate on a network differing from that of operating environment 124, processor 108 and/or the like. In one or more embodiments, network device 136 may include a disparate network wherein transmission data 118 transmitted from operating environment 124 may be transmitted using differing network protocols, differing technologies and/or the like. In one or more embodiments, network devices 136 may include disparate networks wherein communication networks 120 may differ in protocols, technologies and/or the like. In one or more embodiments, disparate networks may include any communication networks 120 as described in this disclosure which differ in protocol, technology, structure and/or the like.

With continued reference to FIG. 1, network controller 140 may be used to facilitate communication between disparate networks. For example, and without limitation, network controller 140 may utilize virtual network overlays to allow resources from disparate networks to interact with one another. In one or more embodiments, virtual network interface may emulate a particular network, wherein network controller 140 may receive transmission data 118 from the virtual network interface and convert transmission data 118 in a format suitable for a disparate network. In one or more embodiments, network controller 140 may be configured to manage multiple disparate networks.

With continued reference to FIG. 1, network controller 140 may utilize one or more discovery protocols in order to identify network devices 136 on one or more communication networks 120. A "discovery protocol" as described in this disclosure is a network protocol used to automatically identify and gather information about devices and their connections within networks. In one or more embodiments, discovery protocol allows devices to share information about their network. In one or more embodiments, discovery protocol may include LLDP as described above. In one or more embodiments, LLDP may allow for identification of devices on ethernet networks. In one or more embodiments. Network devices 136 may transmit information about their network wherein network controller 140 may receive said information. In one or more embodiments, discovery protocol may include a simple network management protocol, a cisco discovery protocol, a multicast DNS and/or the like. In one or more embodiments, discovery protocol may include a constrained application protocol (CoAP). In one or more embodiments, CoAP may be used in constrained devices and networks such as internet of things (IoT). In one or more embodiments, CoAP may operate on top of a user Datagram protocol and may be optimized for devices with limited processing power, memory and battery life. In one or more embodiments, computing devices such as network controller 140 may communicate with a CoAP server in order to find network devices 136 on communication network 120. In one or more embodiments, CoAP may use a particular standardized endpoint for network discovery. In one or more embodiments, CoAP may utilize a particular uniform resource indicator, wherein network devices 136 on communication network 120 may expose information on the uniform resource indicator such that computing devices may identify network devices 136. In one or more embodiments, network devices 136 may transmit information about their associated network on the particular uniform resource indicator (URI). In one or more embodiments, network controller 140 may transmit a request to the particular URI to discover what resources are available. In one or more embodiments, CoAP may support multicast communication, wherein multiple devices may be identified at once in a network. In one or more embodiments, rather than querying each device individually, the network controller 140 may send a multicast request to the entire network or a group of devices. In one or more embodiments, any CoAP server that receives this request and has resources to share will respond with its resource information. In one or more embodiments, network controller 140 may transmit particular requests to receive particular network devices 136. For example, and without limitation, network controller 140 may transmit a request to identify particular sensors, particular network and/or the like, wherein the CoAP server may respond with the particular devices. In one or more embodiments, network controller 140 may use a southbound application program interface to identify network devices 136 or alternatively communication networks 120. A "southbound application program interface (API)" as described in this disclosure is a protocol that allows a network controller 140 to communicate with network devices 136 on a network. In one or more embodiments, southbound APIs allow network controller 140 to dynamically make changes to transmissions based on changes in network performance. In one or more embodiments, examples of southbound APIs may include OpenFlow, Cisco, OpFlex and/or the like.

With continued reference to FIG. 1, network controller 140 may identify network devices 136 by transmitting one or more discovery requests 144. A "discovery request" for the purposes of this disclosure refers to a transmission or request made by network controller 140 to identify network devices 136 on one or more communication networks 120. For example, and without limitation, network controller 140 may transmit a broadcast to announce its presence and seek information from other network devices 136. In one or more embodiments, discovery request 144 may include a request to receive information from other network devices 136 on communication networks 120. In one or more embodiments, network devices 136 may respond to discovery request 144 with information about capabilities, configuration, status and/or the like. In one or more embodiments, discovery request 144 may include a request for information such as but not limited to, a device types, the services offered, the capabilities (e.g. bandwidth, protocols supported, whether the network is active or idle and/or the like. In one or more embodiments, network devices 136 that receive discovery request 144 may transmit information such as but not limited to, a device identifier, services offered, configuration details and/or the like. In one or more embodiments, network controller 140 may identify network devices 136 based on responses given to discovery request 144. In one or more embodiments, network controller 140 may support multiple network protocols or discovery protocols simultaneously in order to identify network devices 136 on disparate networks. In one or more embodiments, processor 108 and/or network controller 140 may be configured for multiple protocols through software configuration and/or virtualization. In one or more embodiments, network controller 140 may include a virtual network controller 140, wherein the virtual network controller 140 includes a virtualized software emulating a network controller 140. In one or more embodiments, virtual network controller 140 may transmit discovery requests 144 based on the network type it is addressing. For example, and without limitation, a particular discovery request 144 may be made for a radio network and a differing discovery request 144 may be made for an ethernet based network.

With continued reference to FIG. 1, in one or more embodiments, discovery request 144 may include a multicast request. A "multicast request" for the purposes of this disclosure refers to a network communication method in which data is sent from one sender to multiple network devices 136 simultaneously. In one or more embodiments, a multicast request may be transmitted to a singular address or destination, wherein all network devices 136 associated with the single address or destination may receive the multicast request. In one or more embodiments, multicast request may be transmitted to a group of devices, wherein a single request may be transmitted to an address associated with a group of devices and all devices within the group may receive multicast request. In one or more embodiments, network controller 140 may join a multicast group wherein the multicast group is defined by a specific multicast addresses. In one or more embodiments, network controller 140 may periodically send multicast messages such as discovery request 144 to the multicast group. In one or more embodiments, network devices 136 within the multicast group may receive the multicast request from the specific multicast address and respond to the request. In one or more embodiments, virtual controller may identify network devices 136 as a function of the multicast request. In one or more movements, disparate network devices 136 may adhere to multicast protocols wherein disparate network devices 136 may receive discovery request 144 and/or multicast request. In one or more embodiments, multicast routing protocols may allow for information to be transmitted to differing networks. In one or more embodiments, network devices 136 may respond to multicast request and/or discovery request 144 wherein processor 108 and/or network controller 140 may identify network devices 136. In one or more embodiments, multicast request may be used to transmit redundant transmission data 118 over multiple network devices 136 to ensure that transmission data reaches its destination. In one or more embodiments, processor 108 may be configured to identify multiple disparate networks through multicast request and transmit transmission data over the multiple disparate networks. In one or more embodiments, a routing path 152 may be created for each network device identified within multicast request wherein multiple redundant data files may be transmitted to ensure receipt by the end user or destination node.

With continued reference to FIG. 1, processor 108 and/or network controller 140 may be configured to identify a congestion datum 148. A "congestion datum" for the purposes of this disclosure refers to information about the performance of a communication network 120. In one or more embodiments, congestion datum 148 may include latency measurements, wherein latency measurement includes the time it takes for data packets to travel between two points in a network. In one or more embodiments, congestion datum 148 may include throughput analysis wherein network controller 140 may identify the amount of data being transmitted over a network segment. In one or more embodiments, congestion datum 148 may include packet loss wherein congestion datum 148 may include the number of packets being lost. In an embodiments, packet loss may indicate that a network may be congested. In one or more embodiments, congestion datum 148 may include utilization, wherein utilization may indicate the bandwidth usage across a network. In an embodiments, if utilization is consistently high, then the network may be configured. In one or more embodiments, congestion datum 148 may be used to evaluate the performance of a network and whether it is suitable for transmission of transmission data 118. In one or more embodiments, congestion datum 148 may indicate if a network is active and capable of sending and/or receiving transmission. In one or more embodiments, congestion datum 148 may include error rates, wherein error rates indicate packet loss and error rates when transmitting information. In one or more embodiments, discovery request 144 may include a request to receive information associated with congestion datum 148 wherein network devices 136 responding to network request may provide congestion datum 148. In one or more embodiments, network controller 140 may make an SNMP request to receive information such as CPU load, memory usage and/or the like. In one or more embodiment, discovery request 144 may be transmitted to a plurality of network devise wherein network devices 136 may respond with congestion datum 148 and/or a portion thereof. In one or more embodiments, network controller 140 may identify congestion datum 148 by attempting to transmit information through a particular network device 136 and/or communication network 120. In an embodiments, network controller 140 may calculate various elements of congestion datum 148 by transmitting data packets and monitoring receipt of the data packets.

With continued reference to FIG. 1, congestion datum 148 may further include a various security status of each network device 146. For example, and without limitation, network devices may transmit whether they contain firewalls, built in security mechanisms to monitor vulnerabilities, intrusion detection mechanisms, firmware integrity checks and/or the like. In one or more embodiments, congestion datum 148 may include a security status of each network device wherein each network device may report how secure the network device is. In one or more embodiments, network device 136 may report that they support secure communication protocols, they are compatible with various security measures, that they have monitoring systems for threat detection and/or the like. In one or more embodiments, congestion datum 148 may include these security features wherein network controller 140 may select network devices based on the security requirement of transmission data 118. For example, and without limitation, transmission priority and/or metadata may indicate that transmission data may only be transmitted through secure and/or encrypted networks wherein congestion datum 148 may indicate which network devices adhere to any requirements posed by transmission data 118. In one or more embodiments, congestion datum may further include connected device to network device 136 wherein processor may determine if a path exists if network device 136 is connected to other network devices. In one or more embodiments, processor 108 may be configured to query a single network device, wherein processor 108 may receive a list of network device connected to the single network device. IN one or more embodiments, discovery protocols such as link layer discovery protocols, cisco discovery protocols, simple network management protocols and/or the like may be used to query a first device and request all devices connected to the first device. In one or more embodiments, processor 108 may then be configured to query all devices connected to the first network device 136 in order to determine the most suitable second network device. In one or more embodiments, processor 108 may use discovery request to determine all network devices on a network and all subsequent network devices connected to the first set of network devices and so on until a map is created from a source to a destination. In one or more embodiments, processor may be configured to receive a plurality of network devices wherein multiple sets of network devices connected to one another from a source to a destination may be discovered. In one or more embodiments, congestion datum may be used to identify subsequent network devices connected to a first network device and additional network devices connected to the subsequent devices, thereby forming a path of network devices from a source to a destination. In one or more embodiments, processor 108 may be configured to identify congestion datum 148 for all network devices identified in order to determine routing path 152.

With continued reference to FIG. 1, congestion datum 148 may be received iteratively wherein processor 108 and/or network controller may determine the relative strength of network devices 136 based on changes in congestion datum 148. For example, and without limitation, changes in latency may indicate that the strength of a network device is increasing or decreasing. In one or more embodiments, changes in latency may indicate that system 100 may be located further away from network device 136 and/or system 100 is physically travelling in a direction toward or away from network device 136. In one or more embodiments, changes in bandwidth may indicate that that network device 136 may be unreliable. In one or more embodiments, processor may use round-trip time (RTT) to determine the relative distance of a network device 136 and whether a distance to network device is increasing or decreasing. In one or more embodiments, processor 108 may be configured to compare changes in congestion datum 148 to determine a relative network strength when determining routing paths 152 as described in further detail below. In one or more embodiments, changes in congestion datum 148 such as bandwidth and/or latency may indicate that a network device is unreliable. In one or more embodiments, processor 108 may be configured to monitor throughput of each network device 136 over a given period of time wherein high throughput may indicate that network device is reliable 136.

With continued reference to FIG. 1, congestion datum 148 may further include an indication of transmission data 118 can reliably reach an intended destination such as destination node or intended recipient. In one or more embodiments, discovery request discovery request may include a network reachability test to determine if network device can reach a destination. A "Network reachability test" as described in this disclosure refers to a determination as to whether a network device can communicate with a specified destination. For example, and without limitation network reachability test may be used to determine if network device 136 can properly transmit transmission data to an intended recipient. In one or more embodiments, network reachability test may be used to ensure end-to end connectivity such that transmission data can travel from a source or source node to a destination or destination node. In one or more embodiments, network reachability test may be used to validate a routing path 152 in which transmission data may be transmitted on. In one or more embodiments, processor 108 and/or network controller 140 may transmit a ping command to a target device or destination. If the destination is reachable, then the network device is determined to be reliable. In one or more embodiments, discovery request may include traceroutes to map a path to the destination. In one or more embodiments, traceroute may be used to determine if there are connectivity issues along a route from a source to destination. In one or more embodiments, processor 108 may be configured to transmit test data and/or pings to determine if the test data and/or pings reach their intended location.

With continued reference to FIG. 1, network controller 140 may be configured to determine a routing path 152 for transmission data 118. A "routing path" for the purposes of this disclosure refers to a route in which data travels from a source to a destination. For example, and without limitation, routing path 152 may include one or more network devices 136 which may relay transmission data 118 from a source to a destination. In one or more embodiments, routing path 152 may include multiple network devices 136 which may receive and transmit transmission data 118, one or more communication networks 120 that are selected for transmission, and/or one or more particular connections between the network devices 136 that allow for transmission and/or the link. In one or more embodiments, routing path 152 may include the particular type of communication network 120 transmission data 118 is transmitted on. For example, and without limitation, routing path 152 may include the use of a cellular network, the use of W-fi, the use of a radio network and/or the like.

With continued reference to FIG. 1, routing path 152 may include one or more participating nodes 156. A "participating node" for the purposes of this disclosure refers to a device, such as a network device as described above, that participates in the communication process between operating environment 124 and another device. In one or more embodiments, participating nodes 156 may be responsible for the transmission of transmission data 118. In one or more embodiments, participating nodes 156 may include networks, devices, network devices 136 and/or remote devices that can receive, store and transmit transmission data 118. In one or more embodiments, operating environments 124 may be located on device with sporadic and/or intermittent network connections wherein transmission data 118 may be transmitted across participating nodes 156 until they arrive at their final destination. In one or more embodiments, processor 108 and/or network controller 140 may be configured to determine a route along one or more participating nodes 156 between a source node and a destination node. In one or more embodiments, the source node may include the source of the transmission of transmission data 118 as computing device 104 and/or database 116. In one or more embodiments, the source node may include the first participating node 156 in a sequence of nodes and/or the initial location of transmission data 118. In one or more embodiments, the destination node includes the final destination of transmission data 118 and/or transmission data 118 such as a device in which operating environment 124 may be running on. In one or more embodiments, the destination node may include the last participating node 156 in a sequence of nodes and/or the final destination of transmission data 118 such as operating environment 124. In one or more embodiments, processor 108 and/or network controller 140 may be configured to determine a routing path 152 among participating nodes 156, wherein transmission data 118 may be transmitted to a corresponding node until they reach their final destination. In one or more embodiments, processor 108 and/or network controller 140 may be configured to generate and/or determine a node path. A "node path" for the purposes of this disclosure is a route for transmission data 118 to travel along in order to be transmitted from a source node to a destination mode. For example, and without limitation node path may include a plurality of participating nodes 156 in which transmission data 118 may be transmitted to until the transmission data 118 has reached the final destination (e.g., operating environment 124) and/or destination node. In one or more embodiments node paths may indicate a set of participating nodes 156 in which transmission data 118 may be transferred to and from until transmission data 118 has reached a final destination. In one or more embodiments, routing path 152 may include node path. In one or more embodiments, routing algorithms may be used to determine the most optical path from a source node to a destination node. In one or more embodiments, routing algorithms may depend on the connection between participating nodes 156, the storage capacity of participating nodes 156, the historical success of a participating node 156 and the like. In one or more embodiments, processor 108 and/or network controller 140 may be configured to determine one or more paths in which transmission data 118 may be transmitted wherein the paths include one or more nodes connected to one another. In one or more embodiments, during instances in which a connection is made, data may be transferred one or more participating nod to another until the transmission data 118 arrive at their final destination.

With continued reference to FIG. 1, processor 108 and/or network controller 140 may use predictive modeling to determine which participating nodes 156 should be selected for transmission of transmission data 118. In one or more embodiments, predictive modeling may allow for predictions of future and/or anticipated network connections based on historical data, wherein participating nodes 156 may be selected as a result. In one or more embodiments, processor 108 may use adaptive modeling to reroute transmission data 118 in order to increase the transmission rate of transmission data 118. In one or more embodiments, processor 108 may be configured to select nodes based on their ability to transmit data. In one or more embodiments, processor 108 may assign transmission data 118 to selected participating nodes 156 based on the size of transmission data 118 and the capacity of participating nodes 156. In one or more embodiments, processor 108 may utilize predictive modeling, adaptive modeling, selection of nodes and the like as a function of a machine learning model. The machine learning model may include any machine learning model as described in this disclosure. Processor 108 may use a machine learning module, such as a node machine learning module for the purposes of this disclosure, to implement one or more algorithms or generate one or more machine-learning models, such as a node machine learning model to determine one or more paths for transmission data 118 to be transmitted along. However, the machine learning module is exemplary and may not be necessary to generate one or more machine learning models and perform any machine learning described herein. In one or more embodiments, one or more machine-learning models may be generated using training data. Training data may include inputs and corresponding predetermined outputs so that a machine-learning model may use correlations between the provided exemplary inputs and outputs to develop an algorithm and/or relationship that then allows machine-learning model to determine its own outputs for inputs. Training data may contain correlations that a machine-learning process may use to model relationships between two or more categories of data elements. Exemplary inputs and outputs may come from database 116, such as any database 116 described in this disclosure, or provided by a user. In other embodiments, a machine-learning module may obtain a training set by querying a communicatively connected database 116 that includes past inputs and outputs. Training data may include inputs from various types of databases 116, resources, and/or user inputs and outputs correlated to each of those inputs so that a machine-learning model may determine an output. Correlations may indicate causative and/or predictive links between data, which may be modeled as relationships, such as mathematical relationships, by machine-learning models, as described in further detail below. In one or more embodiments, training data may be formatted and/or organized by categories of data elements by, for example, associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to categories by tags, tokens, or other data elements. A machine learning module, such as node machine learning module, may be used to create node machine learning model and/or any other machine learning model using training data. Node machine learning model may be trained by correlated inputs and outputs of training data. Training data may be data sets that have already been converted from raw data whether manually, by machine, or any other method. Node training data may be stored in database 116. Node training data may also be retrieved from database 116. In some cases node machine learning model may be trained iteratively using previous inputs correlated to previous outputs. For example, processor 108 may be configured to store participating node 156 paths and their corresponding transmission from current iterations to train the machine learning model. In some cases, the machine learning model may be trained based on user input. For example, a user may indicate that determined paths or routing paths 152 were unreliable and/or slow wherein the machine learning model may be trained as a function of the user input. In some cases, the machine learning model may allow for improvements to computing device 104 such as but not limited to improvements relating to comparing data items, the ability to sort efficiently, an increase in accuracy of analytical methods and the like. In one or more embodiments, node training data may include a plurality of source nodes and destination nodes correlated to a plurality of node paths. In one or more embodiments source nodes and destination nodes may be determined based on the source of the transmission (i.e., processor 108 and/or a central server) and the destination of the transmission (i.e. operating environment 124). In an embodiment, node path may include a route from a source node to a destination node. In one or more embodiments, node machine learning model may be configured to output node paths based on source nodes and destination nodes. In one or more embodiments, node machine learning model may be trained using historical data such as transmissions made on previous iterations. In an embodiment, historical data may indicate the most optical node paths between source node and destination node. In one or more embodiments, following each iteration of the processing of system 100, node paths and their corresponding transmission time may be used to iteratively train machine learning model in order to create more efficient node paths. In one or more embodiments, training of node machine learning model may allow for selection of more efficient node paths and may increase the reliability of a transmission. In one or more embodiments, each participating node 156 may include a correlated storage capacity, wherein the correlated storage capacity may indicate the maximum storage size of a transmission data 118. In one or more embodiments, processor 108 and/or network controller 140 may be configured to assign transmission data 118 to node paths based on storage size using node machine learning model. In one or more embodiments, processor 108 may be configured to identify a plurality of participating nodes 156 on a network, wherein processes may be configured to determine node path as a function of the plurality of participating nodes 156. In one or more embodiments, node machine learning model may be configured to receive plurality of participating nodes 156, including source node and destination node wherein node machine learning model may be configured to generate node path from source node to destination node. In one or more embodiments, node machine learning model may be trained on node training data wherein node training data contains a plurality of source nodes and destination nodes correlated to a plurality of node paths. In one or more embodiments, processor 108 may be configured to identify source nodes and destination nodes based on the operating environment 124, wherein the identified operating environment 124 may contain a corresponding destinate node. In one or more embodiments, processor 108 and/or network controller 140 may be associated with a source node. In one or more embodiments, processor 108 may be configured to determine node path as a function of node machine learning model wherein node path may indicate a path for transmission data 118 to be transmitted from operating environment 124 to another device. In one or more embodiments, processor 108 may identify a plurality of participating nodes 156 to be used for transmission of transmission data 118 wherein node path may contain the plurality of participating nodes 156 and a path along the plurality of participating nodes 156.

With continued reference to FIG. 1, nodes within a network may be found and/or identified through intermittent connectivity wherein nodes may come into contact within each other when they are within a communication range. In one or more embodiments, when nodes come into contact with each other, the nodes share information such that data is transferred from one node to another. Ine or more embodiments, nodes may communicate with other nodes based on routing protocols. In one or more embodiments, participating nodes 156 may be found using periodic beaconing or encounter logging such that data may be transferred from one node to another node. In one or more embodiments, network controller 140 may be configured to identify participating nodes 156 based on identified network devices 136. In one or more embodiments, network devices 136 that respond to discovery request 144 may be identified as participating nodes 156.

With continued reference to FIG. 1, each participating node 156 may be configured to transmit a single portion of transmission data 118. In one or more embodiments, each portion of transmission data 118 of the plurality of portions of transmission data 118 is transmitted with a participating node 156. In one or more embodiments, a plurality of participating nodes 156 may exist wherein each participating node 156 may be responsible for at least one portion of transmission data 118. In one or more embodiments, a plurality of node paths may exist and/or be generated wherein each node path may be configured for a singular portion of transmission data 118. In one or more embodiments, a portion of transmission data 118 may be transmitted along a singular node path wherein each node is configured to transmit a first portion of transmission data 118 and receive a corresponding portion of transmission data 118 for transmission. In one or more embodiments, transmission data 118 may be transmitted individually along node path wherein each participating node 156 may acquire and transmit a singular portion or transmission data 118 at a time.

With continued reference to FIG. 1, nodes and/or participating nodes 156 may transmit information using different communication and/or network channels. In one or more embodiments, nodes may transmit information over wireless fidelity (Wi-Fi). In one or more embodiments, data may be transmitted over Wi-Fi networks in areas with widespread Wi-Fi coverage. In one or more embodiments, nodes may transmit information through Bluetooth wherein information may be transmitted to devices near one another. In one or more embodiments, nodes may transmit information along cellular networks such as 2G, 3G, 4G and/or 5G networks. In one or more embodiments, information may be transmitted between nodes using satellite communication wherein nodes may be transmitted between each other in remote areas and/or over long distances. In one or more embodiments, nodes may communicate using Ad Hoc networks wherein nodes may communicate with each other directly without a centralized infrastructure. In one or more embodiments, nodes may transmit information on tactical radio networks operating on differing frequency bands. In one or more embodiments, nodes may transmit information and/or transmission data 118 using mesh networks (as described in further detail below), secure communication protocols, UAV relays and the like. In one or more embodiments, nodes may transmit information using any of the communication networks 120 and/or network devices 136 as described above. In one or more embodiments, transmission data 118 may be transmitted across differing communication network 120, wherein for example, a transmission data 118 may first be transmitted through Wi-Fi and then over satellite. In one or more embodiments, delay tolerant networking may include a heterogenous network where nodes may communicate with each other using various communication technologies. In one or more embodiments, transmission data 118 may be adaptable to multiple network channels wherein transmission data 118 may be transmitted over multiple differing network channels. In one or more embodiments, processor 108 and/or another computing system may find participating nodes 156 amongst multiple networks wherein transmission data 118 may be stored in nodes until a participating node 156 is available to receive transmission data 118. In one or more embodiments, plurality of portions of transmission data 118 may be transmitted through multiple differing network channels as described above. In one or more embodiments, transmitting the plurality of portions of transmission data 118 to the at least one operating environment 124 includes interleaving the plurality of transmission data 118 through multiple network channels. In one or more embodiments, an "interleaving" process as described in this disclosure refers to the use of multiple differing network channels to transmit transmission data 118 from a source node to a destination node. For example, and without limitation, interleaving may include the process of transmitting transmission data 118 from a first node to a second node using Wi-Fi and from the second node to the third node using satellite networks. In one or more embodiments, interleaving may include network interleaving wherein network interleaving includes a process in which data is distributed across multiple networks. In one or more embodiments, network interleaving may allow for improved reliability of transmission of transmission data 118 wherein transmission data 118 may be transmitted through differing routes when a network is unavailable or no longer reliable at a particular point during transmission. In one or more embodiments, network interleaving may increase transmission speed wherein networks with high bandwidth may be used when available. In one or more embodiments, network interleaving may further allow for faster data transmission wherein data bundles may be transmitted across differing networks based on congestion, bandwidth and the like. In one or more embodiments, network interleaving may be used for redundancy wherein similar transmission data 118 such as duplicates of transmission data 118 may be transmitted over differing networks to ensure that the transmission is received. In one or more embodiments, network interleaving may allow for load balancing wherein data may be distributed across multiple networks in order to reduce loads on each network.

With continued reference to FIG. 1, network controller 140 may be configured to determine a routing path 152 based on network devices 136 that have responded to discovery request 144. In an embodiments, network devices 136 may respond to discovery request 144 with congestion datum 148. In one or more embodiments, network controller 140 may determine routing path 152 and/or node path based on congestion datum 148. In one or more embodiments, network controller 140 may identify network devices 136 having low utilization, high bandwidth and/or the like wherein network controller 140 may prioritize network devices 136 having high bandwidth or lower congestion based on congestion datum 148. In one or more embodiments, network controller 140 may be configured to select one or more network devices 136 for routing path 152 based on congestion datum 148. In one or more embodiments, congestion datum 148 may indicate the availability of a particular communication network 120, the availability of a particular network device 136 and/or the like.

With continued reference to FIG. 1, In one or more embodiments, routing path may include more than one routing paths. In one or more embodiments, processor 108 and/or network controller 140 may be configured to identify multiple parallel routing paths having similar destinations. In one or more embodiments, network controller 14-0 may be configured to transmit transmission data 118 along multiple parallel routing paths 152 to ensure that transmission data 118 reaches its destination. In one or more embodiments, a destination node may identify the multiple sets of transmission data, if any and only accept one set of transmission data. In one or more embodiments, multiple routing paths may ensure that transmission data properly reaches its destination. In one or more embodiments, network controller may be configured to monitor network devices 136 and instruct network devices to cease transmission of one set of transmission data if another set of transmission data has reached its destination. In one or more embodiments, network controller 140 may identify multiple parallel routing paths along differing network devices and/or communication networks to ensure that at least one communication network may successfully transmit transmission data 118.

With continued reference to FIG. 1, routing path 152 may be determined based on the reliability of network devices 136. In one or more embodiments, connections with network devices 136 may be intermittent due to connectivity and/or changes within location of processor 108. In one or more embodiments, routing path 152 may be determined based on network devices that do not change in connection strength. In one or more embodiments, congestion datum may indicate the strength of a connection to network device 136. In one or more embodiments, congestion datum may be received iteratively wherein changes in strength to a network device may indicate to processor 108 that a particular network device 136 is not reliable for routing path 152. For example, and without limitation, a satellite connection to processor 108 may be consistent in the middle of a desert whereas an ethernet connection may decrease as a computing device 104 travels away from the source of the ethernet connection. In one or more embodiments, routing path 152 may be determined based on network devices 136 that do not change in strength as indicated by iterative receipt of congestion datum. In one or more embodiments, unreliable network devices may be used for transmissions requiring lower bandwidth wherein transmission may be sent before processor 108 loses connection to network device 136. In one or more embodiments, processor may be configured to iterative receive congestion datum to determine the changes in strength of connections to network devices 136. In one or more embodiments, an increased in strength may indicate that system 100 is travelling in the direction of network device 136, and as a result, network device may be reliable for routing path while decreases in strength may indicate that system 100 is travelling away from network device 136. In one or more embodiments, processor 108 may be configured to identify a plurality of network devices and prioritize network devices based on strength, bandwidth and/or capability of transmission data before a potential disconnection between processor and the network device 136.

With continued reference to FIG. 1, processor 108 may divide transmission data 118 into a plurality of data bundles using fragmentation. In one or more embodiments, fragmentation may include a process in which data is divided into smaller chucks or packets, wherein each chunk or packet is encapsulated into a separate data bundle. In one or more embodiments, fragmentation may occur that the network or transport layer by protocols designed for delay tolerant network 156ing environments. In one or more embodiments, protocols used for fragmentation may include bundle protocols (BP) specified by the internet engineering task force. In one or more embodiments, the size of fragments or data bundles may be determined based on real-time network conditions, such as bandwidth, node buffer, latency and the like. In one or more embodiments, processor may fragment transmission data into multiple fragments prior to transmission wherein each fragment may be transported as a data bundle. In one or more embodiments, fragmentation may occur prior to transmission and/or at the bundle layer itself. In one or more embodiments, data bundles may first be created for transmission wherein data bundles may further be fragmented into sub bundles during transmission based on network availability, latency and the like. In one or more embodiments, a fragmentation process may include dynamic fragmentation. In one or more embodiments, dynamic fragmentation may include a process in which the size and number of data bundles are determined based on real-time network conditions such as available bandwidth, node buffer and the like. In one or more embodiments, processor, a central server and/or the network responsible for transmission may fragment transmission data 118 based on network availability. In one or more embodiments, each data bundle may contain a portion of transmission data 118 wherein, when aggregated the plurality of data bundles may be used to reconstruct transmission data 118 at the destination such as operating environment 124.

With continued reference to FIG. 1, processor 108 may be configured to duplicate transmission data 118 and/or portions thereof. In one or more embodiments, a duplicate of transmission data 118 may include a second transmission data containing similar information as a first transmission data. In one or more embodiments, a duplicate of transmission data 118 (referred to hereafter as 'duplicate data') may include substantially similar information, file size, file type and the like as transmission data 118. In one or more embodiments, processor may be configured to generate duplicate data and transmit duplicate data along with and/or simultaneous with transmission data 118. In one or more embodiments, processor 108 may be configured to generate multiple duplicate data and transmit the multiple duplicate data. In one or more embodiments, each duplicate data may be transmitted along a separate routing path 152. In one or more embodiments, processor 108 may be configured to generate duplicate data and/or multiple duplicate data and generate a plurality of data bundles from the duplicate data. In one or more embodiments, processor 108 may divide transmission data 118 and duplicate data into a plurality of data bundles. In one or more embodiments, transmission data 118 and duplicate data may be divided similarly wherein each data bundle created from transmission data may have an associated corresponding copy or duplicate created by duplicate data. In one or more embodiments, processor 108 may create duplicate data in order to generated redundancy data bundles and/or data bundles containing the same information. In one or more embodiments, redundant data bundles may ensure proper transmission of transmission data wherein a receiver, such as operating environment, may compare duplicate data to transmission data to ensure that the information was properly received. In one or more embodiments, processor 108 may be configured to duplicate or copy transmission data 118 following division into data bundles wherein copies or duplicates of data bundles may be created. In one or more embodiments, each data bundle of a plurality of data bundles may contain one or more corresponding copies having similar information. In one or more embodiments, processor may create duplicate data wherein data bundles created from duplicate data may differ in size from those created from transmission data 118. For example, and without limitation, a first data bundle created from transmission data may be 5 Megabytes in size whereas a first data bundle create from duplicate data may be 7 megabytes in size. In one or more embodiments, processor may create one or more duplicate data in order to ensure proper transmission of transmission data to operating environment. In one or more embodiments, operating environment may compare transmission data to duplicates following receipt wherein changes between transmission data 118 and the duplicates may indicate an issue during the transmission process.

With continued reference to FIG. 1, in one or more embodiments, routing path 152 is selected or determined based on transmission priority 132. In one or more embodiments, metadata such as transmission priority 132 may indicate the type of file of transmission data 118 wherein routing path 152 may be selected based on the file type. For example, and without limitation, network controller 140 may determine a low latency path for transmission data 118 that is associated with video streaming. In one or more embodiments, transmission priority 132 may indicate how transmission data 118 should be delivered wherein network controller 140 may utilize congestion datum 148 to determine routing path 152 based on latency or bandwidth. In an embodiments, a particular transmission data 118 may require low latency and high bandwidth or vice versa. In an embodiments, network controller 140 may utilize transmission priority 132 to determine which routing path 152 is most suitable. In a non-limiting example, large data files may require networks that can handle large bandwidth while data files may require networks and/or network devices 136 capable of low latency. In one or more embodiments, transmission priority 132 may indicate a level of priority or importance wherein network controller 140 may generate routing path 152 in which transmission data 118 is prioritized over data having a low transmission priority. In one or more embodiments, transmission priority 132 may indicate that transmission data 118 requires a specific secure network, the use of firewalls, the use of VPN gateways and/or the like. In one or more embodiments, transmission priority 132 may include metadata indicating that transmission data 118 is encrypted wherein network controller 140 may be configured to determine routing path 152 that contains specific firewalls devices and other network devices 136 configured to handle encrypted data. In one or more embodiments, network controller 140 may be configured to determine differing routing paths 152 for each set of transmission data 118 based on transmission priority 132. For example, and without limitation, a first set of transmission data 118 may be transmitted through MPLS, while a second set may be transmitted through fiber networks and a third set may be transmitted via a satellite network. In one or more embodiments, network controller 140 may prioritize private networks over public networks based on the availability of communication networks 120 as indicated by congestion datum 148. In one or more embodiments, transmission priority 132 may include DAL classification, wherein transmission data 118 with a high DAL classification may receive a more reliable and/or faster routing path 152 in comparison to other transmission data 118. In one or more embodiments, transmission priority 132 may include various network requirements such as high bandwidth, low latency and/or the like wherein routing path 152 may be determined as a function of transmission priority 132. In one or more embodiments, network controller 140 may be configured to prioritize network devices 136 that most closely meet the needs of transmission data 118. in an embodiments, various communication networks 120 may not be available wherein network controller 140 may select the most suitable communication network 120 that is available.

With continued reference to FIG. 1, at least one communication network 120 may include a segmented network. A "segmented network" for the purposes of this disclosure refers to network that has been split up into virtualized network segments. In one or more embodiments, a network may be split into a plurality of virtualized segments wherein each virtualized segment may correspond to a separate and isolated network. In one or more movements, each virtualized segment may contain an allocated bandwidth, allocated latency and/or the like. In one or more embodiments, network controller 140 may be configured to segment communication networks 120 such that transmission data 118 may be isolated from other data that ius being transmitted. In one or more embodiments, network controller 140 may define and enforce segmentation policies. In one or more embodiments, network controller 140 may create virtualized segments within communication network 120 by defining rules for traffic forwarding, isolation and resource allocation without changing the physical structure of the network. In one or more embodiments, network controller 140 may create specific forwarding rules and/or routing paths 152 for each transmission data 118, wherein the forwarding rules or paths determine which path transmission data 118 takes long a network. In one or more embodiments, network controller 140 may ensure that a particular set of data is transmitted through certain switches or network paths such that the transmission data 118 is isolated from other data. In one or more embodiments, network controller 140 may create virtual LANs which allow different portions of the network to operate separately even though they are physically connected. In one or more embodiments, network controller 140 may allocate specific resources to each virtual segment based on predefined policies such that various transmission data 118 is segmented. For example, and without limitation, network controller 140 may define specific policies for a specific transmission priority 132 and other network policies for another transmission priority 132 wherein data may be virtually segmented based on their transmission priority 132. In one or more embodiments, network controller 140 may segment communication network 120 into a segmented network by programming network devices to handle traffic differently. In one or more embodiments, routing paths 152 may include differing forwarding rules, differing network devices 136 to be used and/or the like.

With continued reference to FIG. 1, network controller 140 may be configured to dynamically determine a routing path 152 for transmission data 118. A process of "dynamically determining routing paths 152" as described herein refers to a process in which routing paths 152 are determined based on the current capabilities of the network devices 136. For example, and without limitation, network controller 140 may utilize a first network device 136 for transmission of transmission data 118 in instances in which congestion datum 148 indicates that the first network device 136 is capable of transmitting transmission data 118. However, in instances in which congestion datum 148 indicates that network devices 136 is not capable, network controller 140 may select another routing path 152 and/or network device 136. In one or more embodiments, network controller 140 may dynamically select routing paths 152 based on the current availability of network devices 136. In one or more embodiments, network controller 140 may dynamically select or determine routing paths 152 based on congestion datum 148. In one or more embodiments, network controller 140 may dynamically determine routing paths 152 based on the availability of network devices 136.

With continued reference to FIG. 1, network controller 140 may be configured to iteratively determine and/or receive congestion datum 148 from each network device 136. In one or more embodiments, network controller 140 may be configured to continuously receive congestion datum 148 from one or more network devices 136 and recreate routing paths 152 if necessary. For example, and without limitation, in instances in which a network or network may be associated with high packet loss. Network controller 140 may generate a new routing path 152 for transmission data 118. In one or more embodiments, network controller 140 may iteratively identify or receive congestion datum 148 from network devices 136 and reroute transmission data 118. In one or more embodiments, network controller 140 may identify that specific switches or routes have become overloaded, the link between two devices is congested and/or there is increase latency. In one or more embodiments, network controller 140 may dynamically reroute data through alternate routing paths 152. In one more embodiments, network controller 140 may identify alternate routing paths 152 in order to bypass overloaded or slow devices. Ine on or more embodiments, network controller 140 may update floe tables to dictate how packets are forwarded through the network. In one or more embodiments, rerouting may occur at the packet level for specific types of data like voice or video or at the flow level for entire streams of data from a particular destination. In one or more embodiments, network controller 140 may use flow priorities to ensure that high-priority traffic is rerouted first based on transmission priority 132.

With continued reference to FIG. 1, network controller 140 may use a machine learning model to generate routing paths 152 for transmission data 118. In an embodiments, a machine learning model such as a routing machine learning model may be configured to receive transmission data 118 and/or congestion datum 148 and output a routing path 152. In one or more embodiments, routing machine learning model may include any machine learning model as described in this disclosure. In one or more embodiments, routing machine learning model may include node machine learning model as described above. In one or more embodiments, routing machine learning model may include routing training data including a plurality of network devices 136 and transmission data 118 correlated to a plurality of routing paths 152. In one or more embodiments, routing training data may be generated by a user, $3^{rd}$ Parth and/or the like.

With continued reference to FIG. 1, routing machine learning model may include parameter values. "Parameter values" for the purposes of this disclosure are internal variables that a machine learning model has generated from training data in order to make predictions. In one or more embodiments, parameter values may be adjusted during pretraining or training in order to minimize a loss function. In one or more embodiments, during training, predicted outputs of the machine learning model are compared to actual outputs wherein the discrepancy between predicted output and actual outputs are measured in order to minimize a loss function. A loss function also known an "error function" may measure the difference between predicted outputs and actual outputs in order to improve the performance of the machine learning model. A loss function may quantify the error margin between a predicted output and an actual output wherein the error margin may be sought to be minimized during the training process. The loss function may allow for minimization of discrepancies between predicted outputs and actual outputs of the machine learning model. In one or more embodiments, the loss function may adjust parameter values of the machine learning model. In one or more embodiments, in a linear regression model, parameter values may include coefficients assigned to each feature and the bias term. In one or more embodiments, in a neural network, parameter values may include weights and biases associated with the connection between neurons or nodes within layers of the network. In one or more embodiments, during pretraining and/or training of the machine learning model, parameter values of the machine learning model (e.g. routing machine learning model) may be adjusted as a function of at least one output of the machine learning model. In one or more embodiments, processor 108 may be configured to minimize a loss function by adjusting parameter values of routing machine learning model based on discrepancies between outputs and feedback and the performance of routing paths 152 generated by the output. In one or more embodiments, training routing machine learning model may include adjusting one or more parameter values of routing machine learning model based on feedback received. In one or more embodiments, feedback may be automatically generated wherein network controller 140 may be configured to record the performance of generated routing paths 152. In one or more embodiments, network controller 140 and/or processor 108 may be configured to iteratively adjust parameter values of routing machine learning model based on previous or historical routing paths 152 generated and their corresponding performance. In one or more embodiments, routing machine leaning model may be configured to iteratively output differing routing paths 152 based on congestion datum 148 or the performance of network devices 136. In one or more embodiments, processor 108 and/or network controller 140 may be configured to iteratively receive congestion datum 148 and determine routing paths 152 based on congestion datum 148.

With continued reference to FIG. 1, network controller 140 may include a conversion layer 160. A "conversion layer 160" for the purposes of this disclosure is a system that is configured to convert data from one format or protocol to another. For example, and without limitation, conversion layer 160 may receive datum in as an analog signal and convert the datum to a digital signal. In another non limiting example, conversion layer 160 may convert a datum having a text-based communication protocol into a datum having a binary based communication protocol. In one or more embodiments, conversion layer 160 may be configured to convert data formats, such as converting code from one formatting language to another. For example, and without limitation, from a binary code format to a python related format. In one or more embodiments, conversion layer 160 may be configured to convert a datum between various data protocols, between communication protocols, between network protocols and the like. In one or more embodiments, conversion layer 160 may utilize character encoding in order to convert characters from one readable format to another. In one or more embodiments, conversion layer 160 may encrypt and/or decrypt data. In one or more embodiments, conversion layer 160 may be configured to validate data, authenticate data, and the like. In one or more embodiments, conversion layer 160 may be configured to receive datum such as transmission data 118 having a plurality of differing formats and convert them datum into a single unified format. For example, and without limitation, conversion layer 160 may receive data from a plurality of sensors wherein each sensor may contain a differing format and convert the data to a single unified format. In one or more embodiments, conversion layer 160 may be configured for data transformation wherein data may be converted, cleaned and structured into a particular format. In one or more embodiments, conversion layer 160 may be configured to convert data in a first format to data in a second format. In one or more embodiments, a first format and a second format may include differing network protocols.

With continued reference to FIG. 1, dynamically determining the routing path 152 for the transmission data 118 as a function of the at least a transmission priority 132 and the one or more network devices 136 includes utilizing conversion layer 160 to generate a modified transmission data 118 from the transmission data 118 wherein the conversion layer 160 generates the modified transmission data 118 by converting data in a first format to data in at least a second format. In one or more embodiments, operating environment 124 may only be configured to communicate with particular communication networks 120 whereas an intended recipient 128 set to receive transmission data 118 may operate on another communication network 120. In one or more embodiments, network controller 140 may convert transmission data 118 to modified transmission data 118 wherein modified transmission data 118 include transmission data 118 in other file format, network protocol and/or the like. In one or more embodiments, conversion layer 160 may include a process referred to as protocol translation, wherein protocol translation allows data to be converted from one protocol to another so that it may be communicated through differing networks. In one or more embodiments, conversion layer 160 may encapsulate transmission data 118 within another protocol (also referred to as "tunneling") and decapsulating the transmission data 118 when it reaches its destination. In one or more embodiments, conversion layer 160 may adapt data so that it may be suitable for other networks by adjusting file formats in order to accommodate differing network limitations such as bandwidth.

With continued reference to FIG. 1, network controller 140 and/or processor 108 is configured to transmit transmission data 118 to the indented recipient through routing path 152. An "intended recipient" for the purposes of this disclosure refers to an individual or device configured to receive transmission data 118. In one or more embodiments, intended recipient 128 may include an external environment such as, and without limitation, a computing system, a remote device, a laptop, a desktop computer, a server, a cloud network, a separate operating environment 124 operating on a similar host circuit, a sensor and/or any other device capable of receiving communications.

Figure 2:
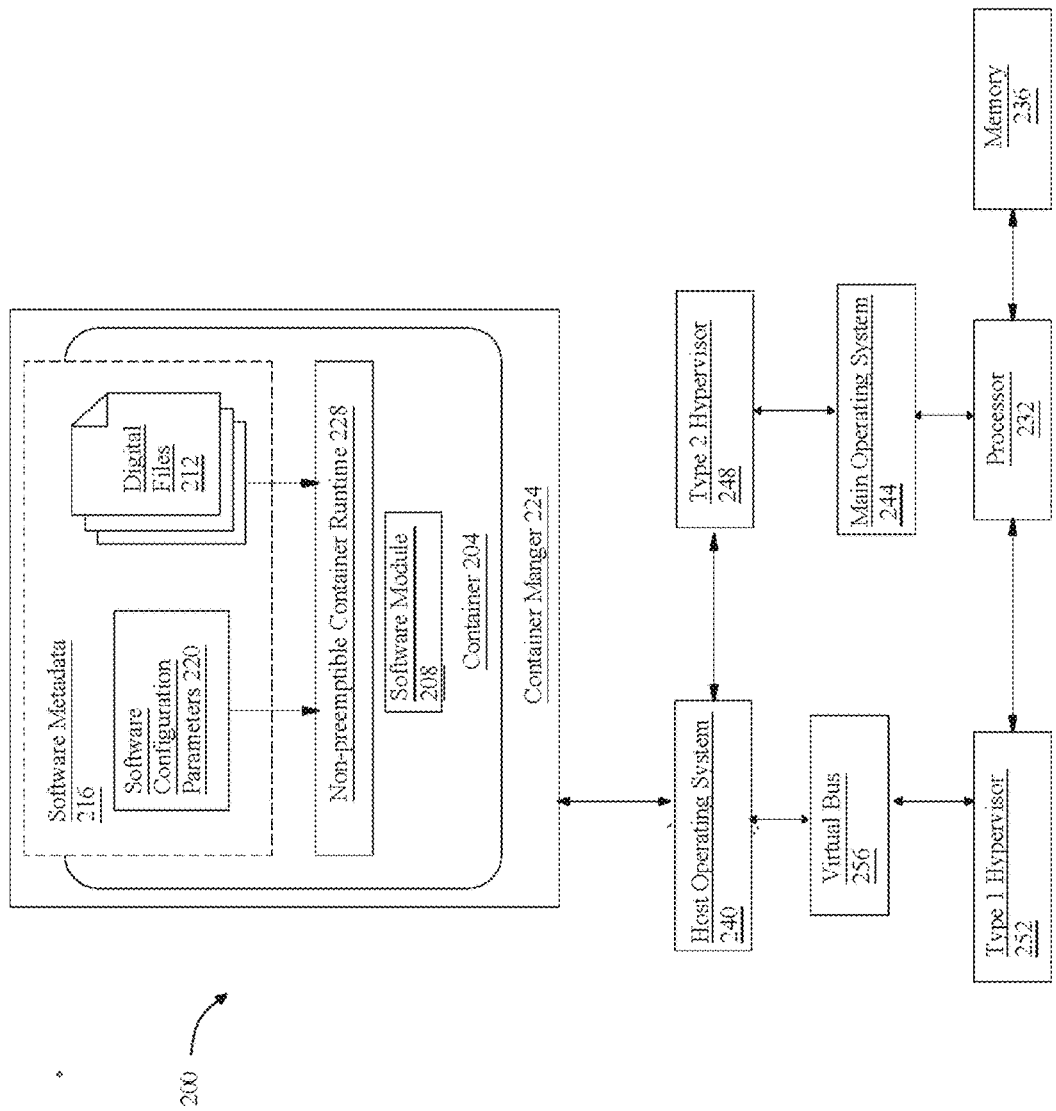
FIG. 2 is a block diagram of a system illustrating a software container in communication with one or more hardware components.

Referring now to FIG. 2, an exemplary embodiments of a system 200 illustrating a container 204 in communication with one or more hardware components is described. Container 204 may include a container such as software container as described in reference to FIG. 1. In an embodiment, a software module 208 may be designed to be reusable and to provide certain functionality that may be integrated into one or more different operating systems or larger software applications. In one or more embodiments, container 204 may allow for software module 208 to be reused on multiple operating systems. In one or more embodiments, container 204 may ensure that any dependencies, libraries and the like needed by software module may be retrieved from within container 204. In one or more embodiments, container may include code, runtime, system tools, system libraries, configurations, and/or the like. In some cases, at least container 204 may provide a "second layer" isolation or protection from a host operating system, environment and other containers and/or partitions. In one or more embodiments, container 2204 may include a standard unit of software that packages up code and all its dependencies such that software module 208 may run under a desired performance from one standard operating environment to another. In one or more embodiments, container contain digital files 212, wherein the digital files 212 contain dependencies, libraries, and/or any other information that may be used to ensure containment of software module 208. In one or more embodiments, instantiating software module 208 into container 204 may include extracting software metadata 216 from software module 208 wherein the software metadata 216 may include a plurality of software configuration parameters 220 and a plurality of digital files 212. As used in this disclosure, "software metadata" is information related to software module 208. In a non-limiting example, software metadata may include a manifest file specifying software version number, required dependencies, configurations and/or the like. As described herein, "software configuration parameters" are parameters that dictate how software module 208 should be set up within a particular standard operating environment (SOE). Exemplary software configuration parameters 220 may include, without limitation, one or more environment variables, service endpoints, port numbers, paths to necessary libraries or dependencies, and/or other configuration data necessary for software module 208 to operate in any virtual environment. In one or more embodiments, a container manager 224 may manage execution of container. In one or more embodiments, container manager 224 may be configured to manage container and ensure that software module 208 operates in an isolated environments. This may be done, for example, by setting up correct file paths, configuring virtual network settings, installing required libraries, and/or the like based on plurality of software configuration parameters 220. Integrating software module 208 may further include deploying plurality of digital files 212 within the initialized container 204. Container manager 224 may place plurality of digital files 212 in correct directories, setting permission, prepare container agent to execute plurality of digital files. In some cases, container agent may load at least one operational rule 122 into non-preemptible container runtime 228, such as a non-preemptible runtime as described above. In cases where container 204 is running at RTOS, certain level of service or response time may be guaranteed. In one or more embodiments, in instances in which container 204 contains a contain-runtime a container manager may not be needed. In a non-limiting example, at least one container 204 may be granted access to at least a processor 232, memory 236, and other resources as described above. Once software module 208 is running, it may have exclusive access to dedicated resources until it completes execution or a conclusion. Exemplary embodiments of at least one container 204 may include a DOCKER container (that encapsulate any payload and dependencies into a single object", RTOS container, safety-certified container (designed to meet stringent certification requirements of regulatory bodies such as, without limitation, FAA or EASA), among others.

With continued reference to FIG. 2, container 204 and/or container manager may communicate directly with a host operating system. In one or more embodiments, in instances in which contain 204 is managed by container manager 224, container manager may communicate with a host operating system 240 wherein the host operating system may transmit the communication to processor 232 and/or memory. In one or embodiments, in instances in which container 204 contains a container-runtime the container run time may communicate with the host operating system 240. In one or more embodiments, the host operating system 240 may include the operating system in which container 204 and/or container manager is running on. In one or more embodiments, host operating system 240 may include a virtual environment located atop a primary operating system and/or a virtual environment in direct communication with hardware components. In one or more embodiments, host operating system 240 may run atop a main operating system 244, wherein the main operating system 244 may include the primary operating system of the computing device and the host operating system 240 may include the virtual environment generated by a virtual machine. In instances in which host operating system may be created atop main operating system 244, a type 2 hypervisor 248 may be used to create a virtualization layer atop main operating system 244. In one or more embodiments, a host operating system 240 may communicate with type 2 hypervisor 248 wherein type 2 hypervisor 248 may communicate with main operating system 244 wherein main operating system may communicate with processor 232 and/or memory 236. In one or more embodiments, in instances in which host operating system does not run atop main operating system 244, type 1 hypervisor 252 may be configured to create a virtualization layer atop the hardware components such as processor and/or memory 236. In one or more embodiments, a virtual bus 256 may allow for communication between host operating system 240 and processor 232. In one or more embodiments, a type 1 hypervisor may allow for increased isolation wherein host operating system 240 may communicate directly with processor. In one or more embodiments, in a type 23 hypervisor, host operating system 240 must first communicate with virtualized components of type 2 hypervisor 248 wherein type 2 hypervisor may communicate with main operating system 244 and finally main operating system 244 may communicate with processor 232.

Figure 3:
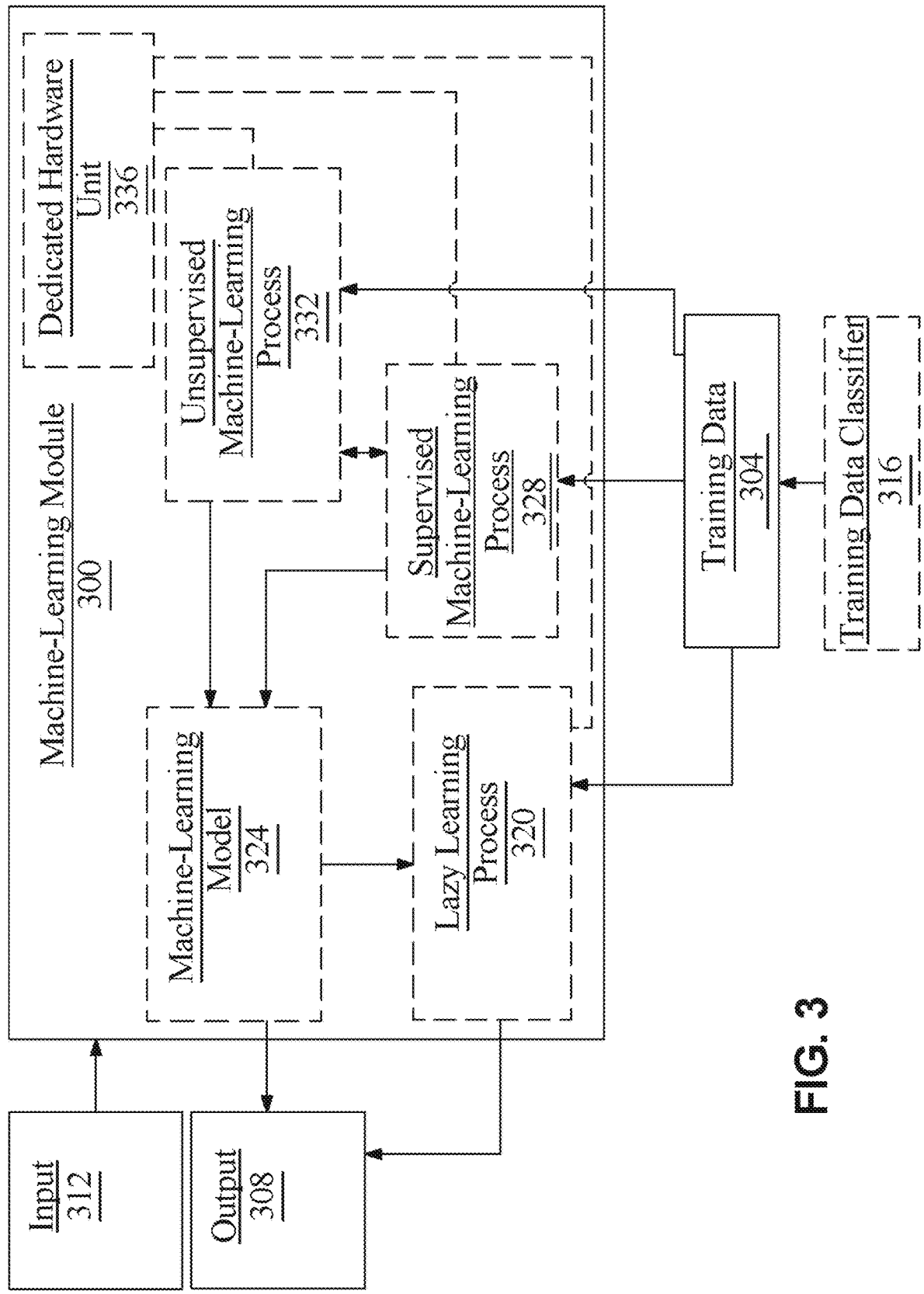
FIG. 3 is a block diagram of exemplary embodiment of a machine learning module.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm instantiated in hardware or software logic, data structures, and/or functions that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure. As a non-limiting illustrative example inputs may include inputs such as congestion datum and/or transmission data and outputs may include routing paths.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 300 may generate a classifier using a classification algorithm, defined as a processes whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 316 may classify elements of training data to communication networks and/or groupings of communication networks. For example, and without limitation, routing paths may be classified based on the particular communication network in which data is being routed on. Continuing, training data classified to a cellular network may generate routing paths for cellular network.

Still referring to FIG. 3, Computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A)\div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device may then calculate a likelihood table by calculating probabilities of different data entries and classification labels. Computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 3, Computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 3, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 3, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 3, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 3, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 3, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators to take advantage of several image statistics as texture descriptors in order to compute a focus level. Blur detection may be performed by using discrete cosine transform (DCT) coefficients in order to compute a focus level of an image from its frequency content.

Continuing to refer to FIG. 3, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by up sampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 3, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 3, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 3, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max}:X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation σ of a set or subset of values:

$$X_{new} = \frac{X - X_{mean}}{\sigma}.$$

Scaling may be performed using a median value of a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 3, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include inputs such as transmission data or congestion datum as described above as inputs, routing paths as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

With further reference to FIG. 3, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 3, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 332 may not require a response variable; unsupervised processes 332 may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 3, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 3, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 3, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 3, one or more processes or algorithms described above may be performed by at least a dedicated hardware unit 336. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A 3 dedicated hardware unit 336 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such 3 dedicated hardware units 336 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more 3 dedicated hardware units 336 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 4:
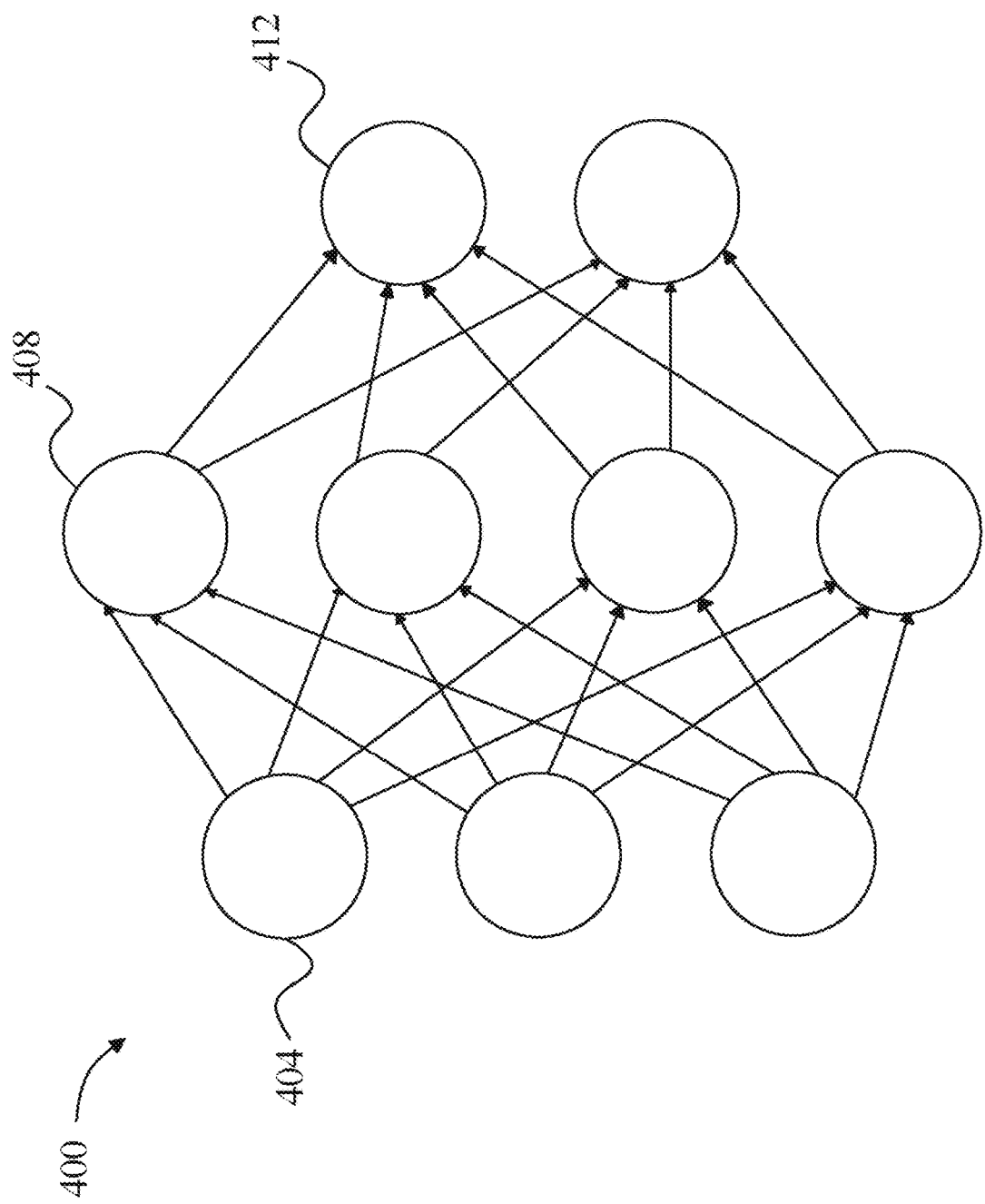
FIG. 4 is a diagram of an exemplary embodiment of a neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
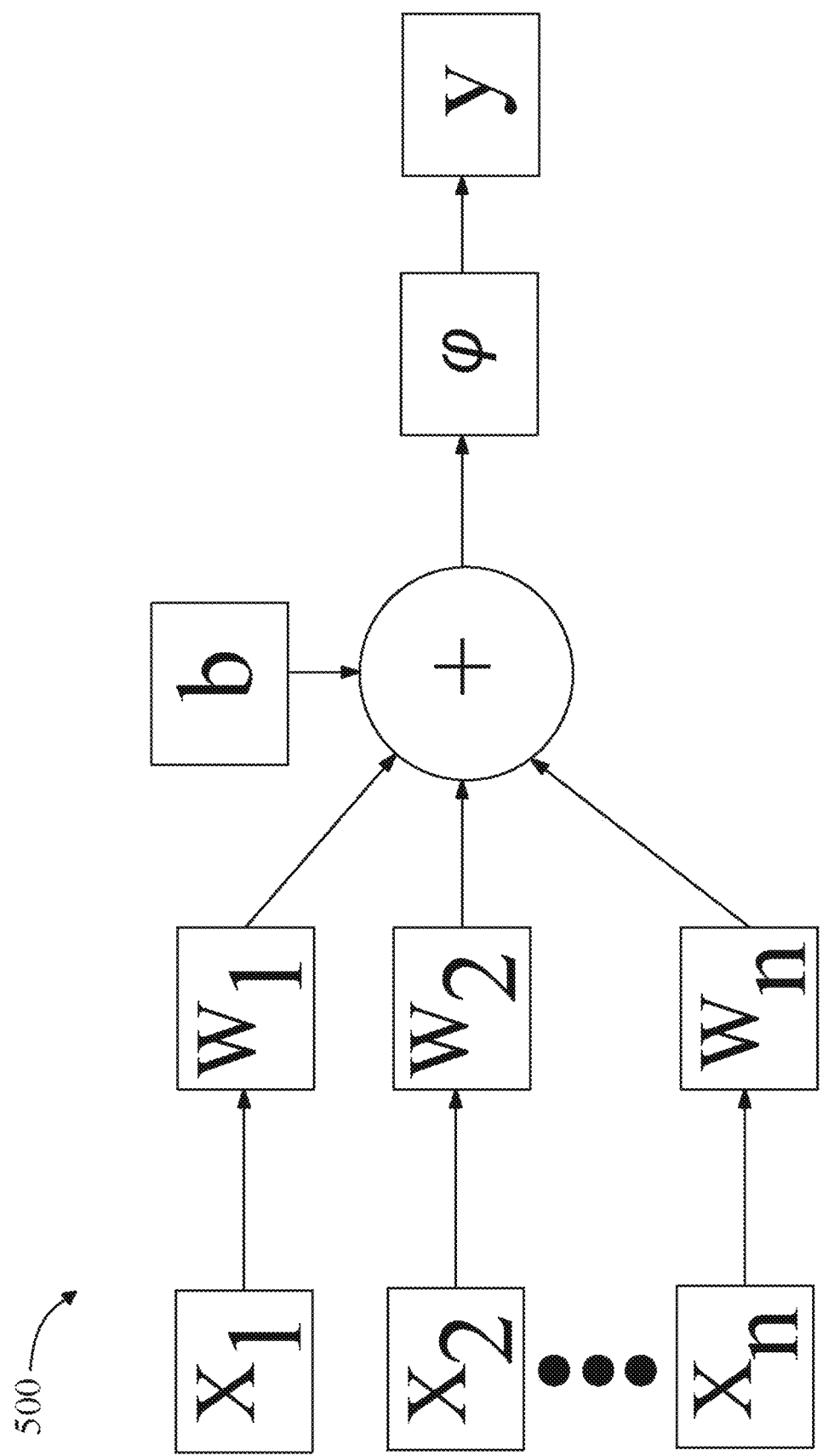
FIG. 5 is a block diagram of an exemplary embodiment of a node of a neural network.

Referring now to FIG. 5, an exemplary embodiment of a node 500 of a neural network is illustrated. A node may include, without limitation, a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1-e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some a, an exponential linear units function such as $$f(x) = \begin{cases} x & \text{for } x \geq 0 \\ \alpha(e^x - 1) & \text{for } x < 0 \end{cases}$$

for some value of α (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $$f(x) = a\left(1 + \tanh\left(\sqrt{2/\pi}\left(x + bx^r\right)\right)\right)$$

for some values of a, b, and r, and/or a scaled exponential linear unit function such as $$f(x) = \lambda \begin{cases} \alpha(e^x - 1) & \text{for } x < 0 \\ x & \text{for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 6:
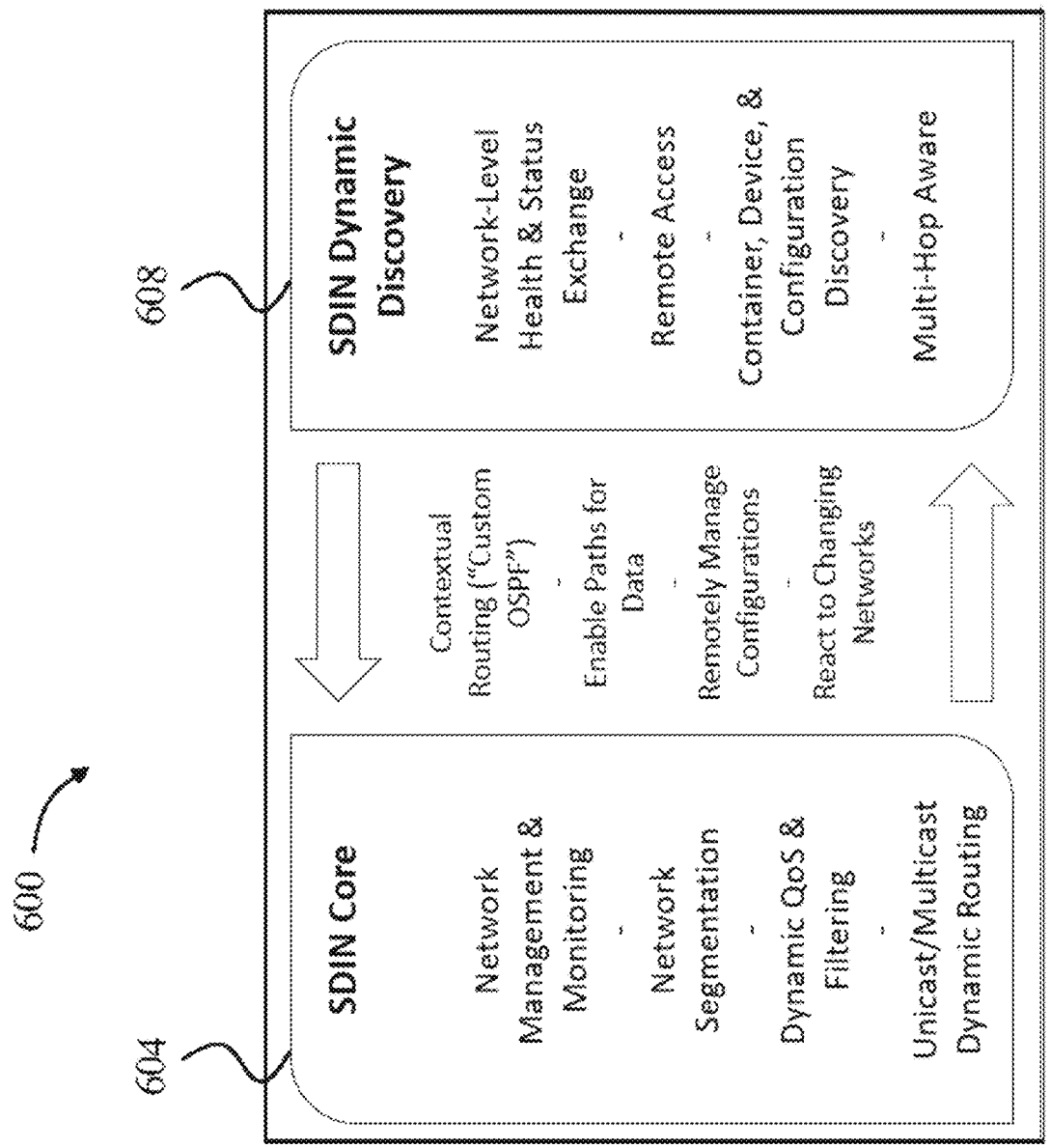
FIG. 6 is a diagram of an exemplary embodiment of a network controller architecture.

Referring now to FIG. 6, an exemplary embodiment of a network controller architecture 600 is described. In one or more embodiments, network controller architecture 600 may include any network controller as described in this disclosure. In one or more embodiments, network controller architecture 600 may include a software-defined intelligent network. In one or more embodiments, network controller architecture 600 may include an SDIN core 604. An "SDIN core" as described in this disclosure refers a central management framework of a network controller that controls and orchestrates network resources using software-defined networking principles. In one or more embodiments, the SDIN 604 core may be responsible for network management and monitoring. In one or more embodiments, SDIN core 604 may gather information from various discovery sources to determine the capabilities of networks and how they continuously change. In one or more embodiments, a network controller may routinely and/or iteratively send discovery requests in order to determine what network devices are connected to a system. In one or more embodiments, the SDIN core 604 is responsible for managing networks, creating flow rules, updating flow tables, allocating resources and/or the like. In one or more embodiments, SDIN core 604 may be responsible for identifying trends, performance metrics, potential issues and/or the like. In one or more embodiments, the SDIN core 604 is responsible for network segmentation. In one or more embodiments, network segmentation may include the allocation of resource, the isolating of transferred data throughout a network, the virtualization or partitioning of networks in order to isolate information and/or the like as described in reference to at least FIG. 1. In one or more embodiments, SDIN core 604 may be responsible for dynamic QOS and filtering. Dynamic QOS and filtering refers to the ability to adjust network performance parameters in real-time based on changing network conditions, application requirements, user demands and/or the like. In one or more embodiments, dynamic QOS and filtering may ensure that transmission receive the resource they critically needed. In one or more embodiments, dynamic QOS and filtering may ensure that transmission having high transmission priorities are prioritized on a networks. In one or more embodiments, SDIN core 604 may be responsible for dynamic routing, wherein SDIN core 604 may identify the best possible routes for a transmission to take. In one or more embodiments, SDIN core 604 may engage in unicast routing wherein each packet or transmission is addressed to a specific device or destination. In one or more embodiments, SDIN core 604 may be responsible for multicast routing wherein transmission such as transmission data are sent to multiple receivers simultaneously. In one or more embodiments, multicast routing may include the use of multiple network devise in order to ensure that a particular network device does not become overwhelmed by a large file. In one or more embodiments, multicast routing may include the use of multiple routing paths in order to prevent overuse on a particular network device. In one or more embodiments, SDIN core 604 may receive information from various discovery resources and make decisions for the network. In one or more embodiments, SDIN core 604 may create paths for data, manage configurations for transmission and react to changing networks.

With continued reference to FIG. 6, network controller architecture 600 may include dynamic discovery 608. "Dynamic discovery:" for the purposes of this disclosure refers to the capabilities of a network controller to detect and identify devices, services or applications within a network. In one or more embodiments, dynamic discovery 608 may allow for the identification of network devices and their capabilities, recognize new device, monitor changes in network devices, monitor security and/or the like. In one or more embodiments, dynamic discovery 608 may be used by SDIN core 604 in order to make decisions. In one or more embodiments, dynamic discovery 608 may allow for the identification of network devices and network capabilities such that SDIN core 604 may make decisions. In one or more embodiments, dynamic discovery 608 may allow for remote access wherein discovery requests may be transmitted from a remote location and information may be transmitted from network devices, such has for example, congestion datum. In one or more embodiments, dynamic discovery may allow for multi-hop awareness wherein a network controller may contain the capability to manage data transmission across multiple intermediate nodes before reaching its final destination. In one or more embodiments, multi-hop aware may be used to identify the most efficient paths from a source to destination. In one or more embodiments, multi-hop aware may allow for dynamic routing mechanisms in order to meet the changes of changing network conditions.

Figure 7:
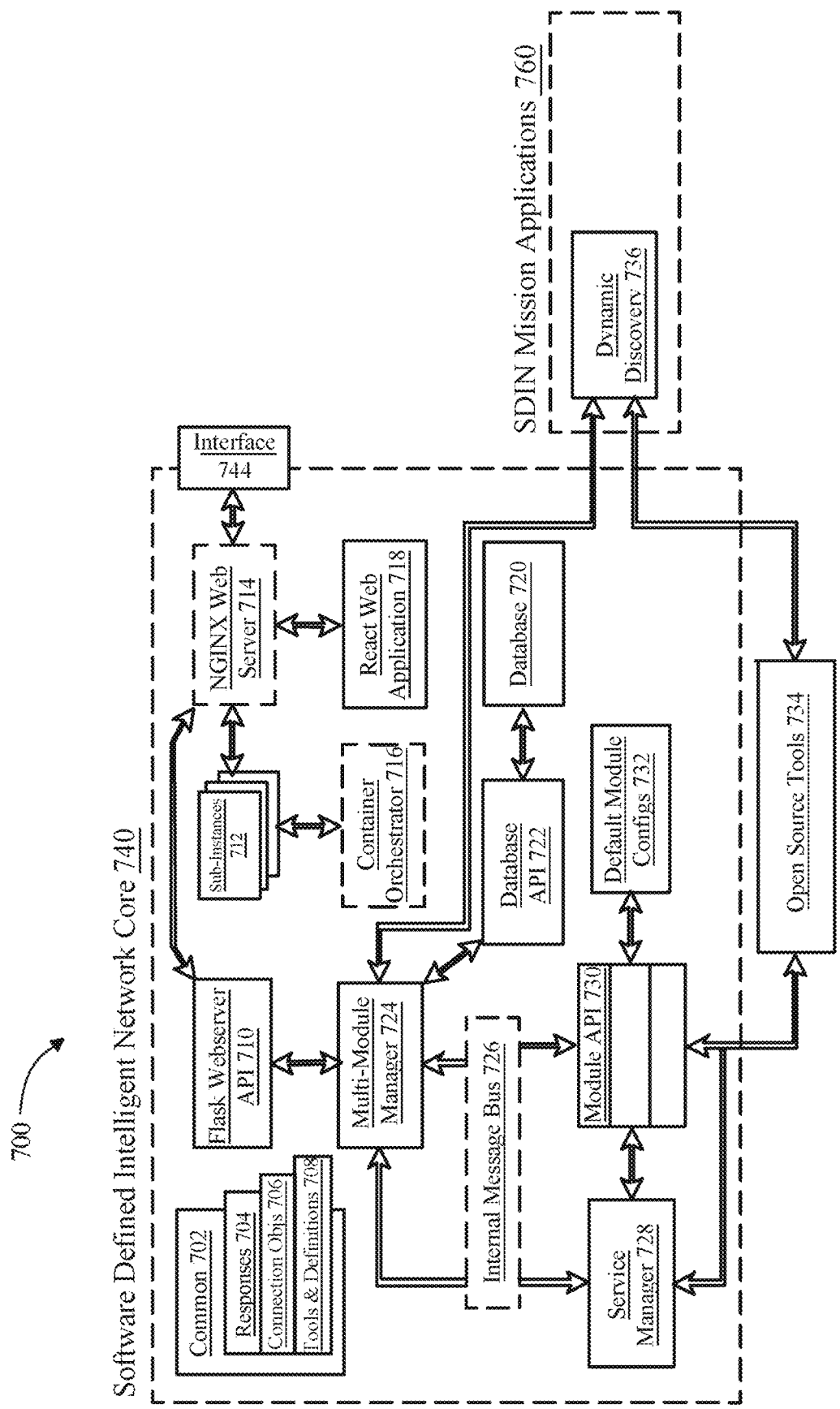
FIG. 7 is a diagram illustrating an exemplary embodiment of a container architecture.

Referring now to FIG. 7, an exemplary embodiment of a container architecture 700 is described. In one or more embodiments, container architecture includes a software defined intelligent container (SDIN) core 740. In one or more embodiments, SDIN core 740 may be consistent with SDIN core as described in reference to FIG. 6. In one or more embodiments, SDIN core 740 may be responsible for receiving data and decision making. In one or embodiments, SDIN core may contain commonality or common 702 elements across various components of the SDIN. In one or more embodiments, commonality between software defined intelligent networks include responses 704. In one or more embodiments responses 704 or actions by SDIN core may be similar. In one or more embodiments, responses 704 may SDIN core 740 may include dynamic resource allocation based on network demands, network monitoring and the like. In one or more embodiments, commonality among SDIN cores may include connection objectives 706. In one or more embodiments, connection objectives may include interoperability, wherein the SDIN may ensure that various system and components can communicate with one another, network performance optimization and/or the like. In one or more embodiments, common elements 702 may further include similar tools and definitions 708. In one or more embodiments, similar tools and definitions 708 may include similar operational definitions, similar software used to control the SDIN and/or the like.

With continued reference to FIG. 7, SDIN core 740 may include a flask webserver API 710. In one or more embodiments, flask webserver API may include a web application framework built using flaks, which is designated to create and manage application programs interfaces (API). Flask may be used to create RESTful APIs, which allow different components of the SDIN to interact over HTTP using standard methods like GET, POST, PUT, and DELETE. The API may enable the exchange of data between the SDIN core 740 and external systems or applications. In one or more embodiments, an NGINX web server 714 can route requests to flask APIs based on defined rules, wherein the Flask API may focus on application logic rather than request handling. This may allow for improved system performance under heavy loads. In one or more embodiments, a multi-module manager 724 may facilitate management of modules such that all required components of a Flask API are loaded and configured correctly. In one or more embodiments, a database API 722 retrieved from a database 720 may provide multimodule manager 724 with consistent data interactions amongst multiple modules. In one or more embodiments, each module can utilize database API to perform data operations. In one or more embodiments, a multimodule manager may manage multiple modules within an SDIN core 740. In one or more embodiments, A react web application 718 may allow for a dynamic user experience, wherein users may be able to visualize data that is generated by the SDIN. In one or more embodiments, NGINZ web server 714 may communicate with an interface 744 and react web allocation 718. In one or more embodiments, sub instances 712 may operate within a larger framework of SDIN core 740. In one or more embodiments, sub instances 712 may include specialized unit that contribute to the functionality and scalability of the network. In one or more embodiments, sub instances 712 may include microservices within the SDIN core, dedicated processing units, API end points and/or the like. In one or more embodiments, sub instances 712 may include container orchestrators 716 which are tasked with the deployment, management and/or the like of containerized applications. In one or more embodiments, applications or software may be contained within containers wherein container orchestrator 716 may help manage containers effectively.

With continued reference to FIG. 7, SDIN core 740 may include an internal message bus 726. In one or more embodiments, internal message bus 726 may facilitate the exchange of messages or data between various components of SDIN core 740. In one or more embodiments, internal message bus may allow for communication between service managers 728, multimodule managers 724 and/or module APIs 730. In one or more embodiments, Module APIs 730 allow for modules to second and receive data between one another. Modules can call functions or services provided by other modules which allows for increased modularity. In one or more embodiments, modules may have default module configuration 732 which refers to predefined settings and parameters that are automatically applied to modules within a system. This allows modules to operate correctly without requiring customization.

With continued reference to FIG. 7, container architecture includes SDIN mission applications 760. In one or more embodiments, SDIN missing applications include specialized applications to support operational goals of the SDIN core 740. This may include retrieval of data, the transmission of data and/or the like. In one or more embodiments, SDIN mission applications may include dynamic discovery 736 wherein the SDIN mission application 760 is configured to identify network devices dynamically and transmit back to SDIN core 740. In one or more embodiments, open source tools 734 may be used to identify network devices and communicate them back to SDIN core.

With continued reference to FIG. 7, container architecture 700 may be migrated into a Kata environment. A kata environment is an open source container runtime with light weight virtual machines that provide for work isolation using hardware utilization. In one or more embodiments, Kata containers include lightweight virtualization technology that can provide a secure and efficient way to isolate applications within a containerized environment. Unlike traditional virtual machines (VMs), Kata Containers may leverage virtual machine technology to create isolated container runtimes. In one or more embodiments, container architecture (and/or network controllers as described in reference to FIG. 1) may be integrated within Kata containers. In one or more embodiments, integration of SDI within kata containers may allow for reduced latency, improved security, and other improvements. In a traditional model, applications run in pods and pods have their own network namespace (private network environment). Pods then contain to an external network using virtual ethernet pairs. As a result, there may be latency as data must reveal through multiple network layers before it reaches its destination. In one or more embodiments, in a Kata environment, tap devices may be used in lieu of veth pairs. In one or more embodiments, tap devices may act as direction connection for pods to a host network. As a result, separate network namespace are not needed, and data may be transferred quicker.

Figure 8:
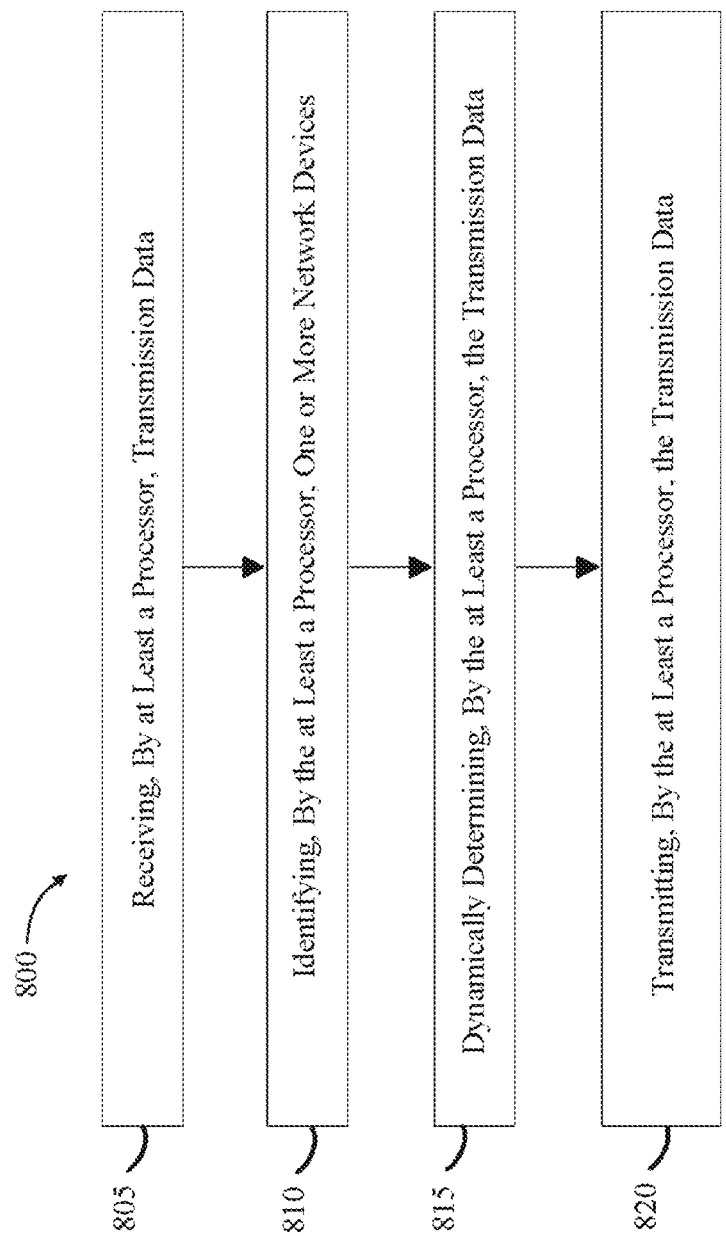
FIG. 8 is a flow diagram illustrating an exemplary embodiment of a method for communication between remote environments.

Referring now to FIG. 8, a method 800 for communication between remote environments is described. At step 805, method 800 includes receiving, by at least a processor, transmission data for transmission from one or more operating environments wherein the transmission data includes an intended recipient of the transmission data and at least a transmission priority. This may be implemented with reference to FIGS. 1-7 and without limitation.

With continued reference to FIG. 8, at step 810 method 800 includes identifying, by the at least a processor, one or more network devices on one or more communication networks, wherein identifying the one or more network devices further comprises determining a congestion datum for each of the one or more network devices. In one or more embodiments, the one or more network devices are associated with one or more disparate networks. In one or more embodiments, identifying, by the at least a processor, the one or more network devices on the communication network includes transmitting a discovery request to a plurality of network devices and identifying the one or more network devices as a function of the discovery request. This may be implemented with reference to FIGS. 1-7 and without limitation.

With continued reference to FIG. 8, at step 815 method 800 includes dynamically determining, by the at least a processor, a routing path for the transmission data as a function of the at least a transmission priority and the one or more network devices. In one or more embodiments, dynamically determining, by the at least a processor, the routing path includes identifying a plurality of participating nodes for transmission of the transmission data. In one or more embodiments, dynamically determining, by the at least a processor, the routing path for the transmission data as a function of the at least a transmission priority and the one or more network devices further includes selecting at least one network device of the one or more network devices for transmission of the transmission data. In one or more embodiments, determining the congestion datum for each of the one or more network devices includes iteratively determining the congestion datum for each of the one or more network devices and dynamically determining, by the at least a processor, the routing path for the transmission data as a function of the at least a transmission priority and the one or more network devices includes iteratively updating the routing path for the transmission data as a function of the iteratively determined congestion datum. In one or more embodiments, dynamically determining, by the at least a processor, the routing path for the transmission data as a function of the at least a transmission priority and the one or more network devices includes utilizing a conversion layer to generate a modified transmission datum from the transmission data wherein the conversion layer generates the modified transmission data by converting data in a first format to data in at least a second format. In one or more embodiments, the first format and the second format include differing network protocols. In one or more embodiments, the communication network includes a segmented network. In one or more embodiments, transmitting the discovery request to the plurality of network devices includes transmitting a multicast request to the plurality of network devices and identifying the one or more network devices as a function of the discovery request comprises receiving a response from the one or more network devices as a function of the multicast request. This may be implemented with reference to FIGS. 1-7 and without limitation.

With continued reference to FIG. 8, at step 820 method 800 includes transmitting, by the at least a processor, the transmission data to the intended recipient through the routing path. This may be implemented with reference to FIGS. 1-7 and without limitation.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 9:
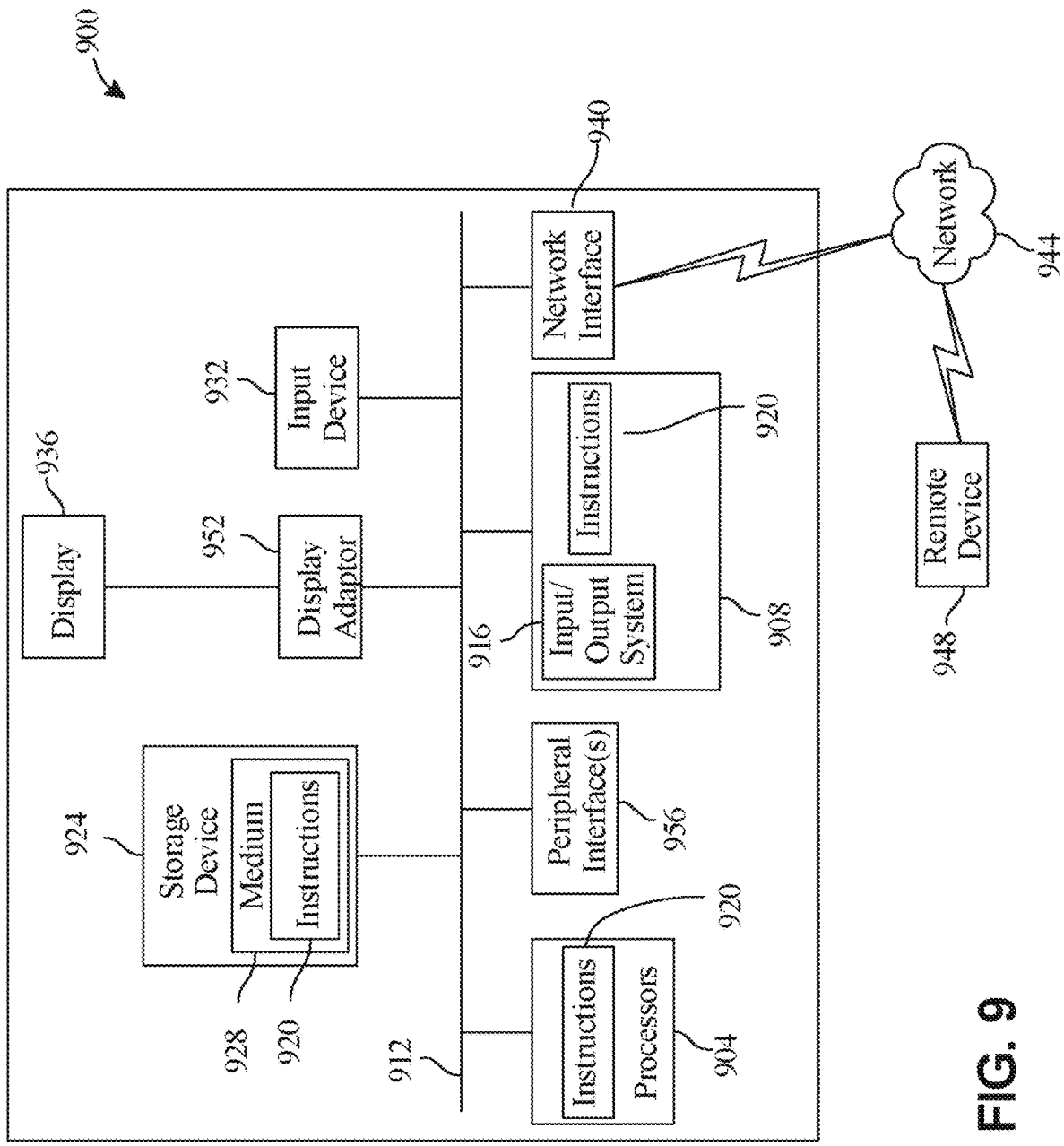
FIG. 9 is a block diagram of a computing system that can be used to implement any one or more of the methodologies disclosed herein and any one or more portions thereof. The drawings are not necessarily to scale and may be illustrated by phantom lines, diagrammatic representations and fragmentary views. In certain instances, details that are not necessary for an understanding of the embodiments or that render other details difficult to perceive may have been omitted.

FIG. 9 shows a diagrammatic representation of one embodiment of a computing device in the exemplary form of a computer system 900 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 900 includes a processor 904 and a memory 908 that communicate with each other, and with other components, via a bus 912. Bus 912 may include any of several types of bus structures including, but not limited to, a memory bus, a memory controller, a peripheral bus, a local bus, and any combinations thereof, using any of a variety of bus architectures.

Processor 904 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 904 may be organized according to Von Neumann and/or Harvard architecture as a non-limiting example. Processor 904 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 908 may include various components (e.g., machine-readable media) including, but not limited to, a random-access memory component, a read only component, and any combinations thereof. In one example, a basic input/output system 916 (BIOS), including basic routines that help to transfer information between elements within computer system 900, such as during start-up, may be stored in memory 908. Memory 908 may also include (e.g., stored on one or more machine-readable media) instructions (e.g., software) 920 embodying any one or more of the aspects and/or methodologies of the present disclosure. In another example, memory 908 may further include any number of program modules including, but not limited to, an operating system, one or more application programs, other program modules, program data, and any combinations thereof.

Computer system 900 may also include a storage device 924. Examples of a storage device (e.g., storage device 924) include, but are not limited to, a hard disk drive, a magnetic disk drive, an optical disc drive in combination with an optical medium, a solid-state memory device, and any combinations thereof. Storage device 924 may be connected to bus 912 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 924 (or one or more components thereof) may be removably interfaced with computer system 900 (e.g., via an external port connector (not shown)). Particularly, storage device 924 and an associated machine-readable medium 928 may provide nonvolatile and/or volatile storage of machine-readable instructions, data structures, program modules, and/or other data for computer system 900. In one example, software 920 may reside, completely or partially, within machine-readable medium 928. In another example, software 920 may reside, completely or partially, within processor 904.

Computer system 900 may also include an input device 932. In one example, a user of computer system 900 may enter commands and/or other information into computer system 900 via input device 932. Examples of an input device 932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 932 may be interfaced to bus 912 via any of a variety of interfaces (not shown) including, but not limited to, a serial interface, a parallel interface, a game port, a USB interface, a FIREWIRE interface, a direct interface to bus 912, and any combinations thereof. Input device 932 may include a touch screen interface that may be a part of or separate from display 936, discussed further below. Input device 932 may be utilized as a user selection device for selecting one or more graphical representations in a graphical interface as described above.

A user may also input commands and/or other information to computer system 900 via storage device 924 (e.g., a removable disk drive, a flash drive, etc.) and/or network interface device 940. A network interface device, such as network interface device 940, may be utilized for connecting computer system 900 to one or more of a variety of networks, such as network 944, and one or more remote devices 948 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 944, may employ a wired and/or a wireless mode of communication. In general, any network topology may be used. Information (e.g., data, software 920, etc.) may be communicated to and/or from computer system 900 via network interface device 940.

Computer system 900 may further include a video display adapter 952 for communicating a displayable image to a display device, such as display 936. Examples of a display device include, but are not limited to, a liquid crystal display (LCD), a cathode ray tube (CRT), a plasma display, a light emitting diode (LED) display, and any combinations thereof. Display adapter 952 and display 936 may be utilized in combination with processor 904 to provide graphical representations of aspects of the present disclosure. In addition to a display device, computer system 900 may include one or more other peripheral output devices including, but not limited to, an audio speaker, a printer, and any combinations thereof. Such peripheral output devices may be connected to bus 912 via a peripheral interface 956. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for communication between remote environments, the system comprising:
   at least a processor; and
   a memory communicatively connected to the at least a processor, the memory containing instructions configuring the at least a processor to:
      receive transmission data from one or more operating environments wherein the transmission data comprises:
         an intended recipient of the transmission data; and
         a transmission priority;
      identify one or more network devices on one or more communication networks, wherein identifying the one or more network devices further comprises determining a congestion datum for each of the one or more network devices;
      dynamically determine a routing path for the transmission data as a function of the transmission priority and the one or more network devices by utilizing a conversion layer to generate a modified transmission datum from the transmission data, wherein the conversion layer generates the modified transmission datum by converting data in a first format to data in at least a second format, wherein the conversion layer encapsulates the transmission data in a second protocol for transmission across a network and decapsulates the transmission data upon reaching a destination network; and
      transmit the transmission data to the intended recipient through the routing path.

2. The system of claim 1, wherein the one or more network devices are associated with one or more disparate networks.

3. The system of claim 1, wherein dynamically determining the routing path comprises identifying a plurality of participating nodes for transmission of the transmission data.

4. The system of claim 1, wherein dynamically determining the routing path further comprises selecting at least one network device of the one or more network devices for transmission of the transmission data.

5. The system of claim 1, wherein:
   determining the congestion datum for each of the one or more network devices comprises iteratively determining the congestion datum for each of the one or more network devices; and
   dynamically determining the routing path for the transmission data as a function of the transmission priority and the one or more network devices comprises iteratively updating the routing path for the transmission data as a function of the iteratively determined congestion datum.

6. The system of claim 1, wherein identifying the one or more network devices on the communication network comprises:
   transmitting a discovery request to a plurality of network devices; and
   identifying the one or more network devices as a function of the discovery request.

7. The system of claim 6, wherein:
   transmitting the discovery request to the plurality of network devices comprises transmitting a multicast request to the plurality of network devices; and
   identifying the one or more network devices as a function of the discovery request comprises receiving a response from the one or more network devices as a function of the multicast request.

8. The system of claim 1, wherein the first format and the second format comprise differing network protocols.

9. The system of claim 1, wherein:
   receiving the transmission data from the one or more operating environments comprises receiving, by a network controller operating within the one or more operating environments, the transmission data;
   identifying the one or more network devices comprises, identifying by the network controller, the one or more network devices; and
   transmitting the transmission data to the intended recipient comprises, transmitting by the network controller, the transmission data from within the operating environment to an external environment.

10. A method for communication between remote environments, the method comprising:
    receiving, by at least a processor, transmission data from one or more operating environments wherein the transmission data comprises:
       an intended recipient of the transmission data; and
       a transmission priority;
    identifying, by the at least a processor, one or more network devices on one or more communication networks, wherein identifying the one or more network devices further comprises determining a congestion datum for each of the one or more network devices;
    dynamically determining, by the at least a processor, a routing path for the transmission data as a function of the transmission priority and the one or more network devices by utilizing a conversion layer to generate a modified transmission datum from the transmission data, wherein the conversion layer generates the modified transmission datum by converting data in a first format to data in at least a second format, wherein the conversion layer encapsulates the transmission data in a second protocol for transmission across a network and decapsulates the transmission data upon reaching a destination network; and transmitting, by the at least a processor, the transmission data to the intended recipient through the routing path.

11. The method of claim 10, wherein the one or more network devices are associated with one or more disparate networks.

12. The method of claim 10, wherein dynamically determining, by the at least a processor, the routing path comprises identifying a plurality of participating nodes for transmission of the transmission data.

13. The method of claim 10, wherein dynamically determining, by the at least a processor, the routing path further comprises:

selecting at least one network device of the one or more network devices for transmission of the transmission data.

14. The method of claim 10, wherein:

determining the congestion datum for each of the one or more network devices comprises iteratively determining the congestion datum for each of the one or more network devices; and dynamically determining, by the at least a processor, the routing path for the transmission data as a function of the transmission priority and the one or more network devices comprises iteratively updating the routing path for the transmission data as a function of the iteratively determined congestion datum.

15. The method of claim 10, wherein identifying, by the at least a processor, the one or more network devices on the communication network comprises:

transmitting a discovery request to a plurality of network devices; and identifying the one or more network devices as a function of the discovery request.

16. The method of claim 15, wherein:

transmitting the discovery request to the plurality of network devices comprises transmitting a multicast request to the plurality of network devices; and identifying the one or more network devices as a function of the discovery request comprises receiving a response from the one or more network devices as a function of the multicast request.

17. The method of claim 10, wherein the first format and the second format comprise differing network protocols.

18. The method of claim 10, wherein:

receiving, by the at least a processor, the transmission data from the one or more operating environments comprises receiving, by a network controller operating within the one or more operating environments, the transmission data;

identifying, by the at least a processor, the one or more network devices comprises, identifying by the network controller, the one or more network devices; and transmitting, by the at least a processor, the transmission data to the intended recipient comprises, transmitting by the network controller, the transmission data from within the operating environment to an external environment.

* * * * *